(12) United States Patent
Saldin et al.

(10) Patent No.: US 11,323,864 B2
(45) Date of Patent: May 3, 2022

(54) SECURITY SYSTEMS

(71) Applicant: Resolution Products, LLC, St. Paul, MN (US)

(72) Inventors: Paul G. Saldin, Stillwater, MN (US); Brian K. Seemann, Lakeville, MN (US); Robert C. Hendrickson, Stillwater, MN (US); David J. Mayne, Eagan, MN (US)

(73) Assignee: Resolution Products, LLC, St. Paul, MN (US)

( * ) Notice: Subject to any disclaimer, the term of this patent is extended or adjusted under 35 U.S.C. 154(b) by 0 days.

(21) Appl. No.: 16/853,547

(22) Filed: Apr. 20, 2020

(65) Prior Publication Data

US 2020/0344586 A1 Oct. 29, 2020

Related U.S. Application Data

(63) Continuation of application No. 16/241,619, filed on Jan. 7, 2019, now abandoned, which is a continuation
(Continued)

(51) Int. Cl.
*G08B 13/18* (2006.01)
*H04W 4/80* (2018.01)
(Continued)

(52) U.S. Cl.
CPC .............. *H04W 4/80* (2018.02); *G08B 25/008* (2013.01); *G08B 25/14* (2013.01); *H04W 84/12* (2013.01)

(58) Field of Classification Search
CPC ....... H04W 4/80; H04W 84/12; H04W 4/008; G08B 25/008; G08B 25/14; G08B 13/2491
(Continued)

(56) References Cited

U.S. PATENT DOCUMENTS 6,624,750 B1 9/2003 Marman
7,262,690 B2 8/2007 Heaton
(Continued)

OTHER PUBLICATIONS

International Search Report in International Application No. PCT/US2016/034801, dated Aug. 31, 2016, 2 pages.

*Primary Examiner* — Naomi J Small
(74) *Attorney, Agent, or Firm* — Fish & Richardson P.C.

(57) ABSTRACT

In one implementation, a wireless security system premises gateway component includes a first local area wireless communication component adapted to communicate wirelessly with plural wireless security system sensors distributed at a premises; a second local area wireless communication component adapted to communicate wirelessly with a general purpose mobile communications device; a communications interface component adapted to communicate with a wide area communications network that is located remotely of the premises; a security system controller component adapted to communicate with the general purpose mobile communications device to provide state information regarding the security system and to provide control inputs to the security system; and a single gateway housing configured and sized to house the first local area wireless communication component, the second local area wireless communication component, the communications interface component, and the security system controller.

18 Claims, 22 Drawing Sheets

Related U.S. Application Data of application No. 15/068,265, filed on Mar. 11, 2016, now Pat. No. 10,178,533.

(60) Provisional application No. 62/168,569, filed on May 29, 2015.

(51) Int. Cl.
*G08B 25/00* (2006.01)
*H04W 84/12* (2009.01)
*G08B 25/14* (2006.01)

(58) Field of Classification Search
USPC .......................................................... 340/567
See application file for complete search history.

(56) References Cited

U.S. PATENT DOCUMENTS

| | | | |
|---|---|---|---|
| 7,449,999 B2 | 11/2008 | Hevia | |
| 7,633,385 B2 | 12/2009 | Cohn | |
| 7,855,635 B2 | 12/2010 | Cohn | |
| 7,956,736 B2 | 6/2011 | Cohn | |
| 8,073,931 B2 | 12/2011 | Dawes | |
| 8,335,842 B2 | 12/2012 | Raji | |
| 8,456,278 B1 | 6/2013 | Bergman | |
| 8,473,619 B2 | 6/2013 | Baum | |
| 8,478,844 B2 | 6/2013 | Baum | |
| 8,478,871 B2 | 7/2013 | Gutt | |
| 8,612,591 B2 | 12/2013 | Dawes | |
| 8,638,211 B2 | 1/2014 | Cohn | |
| 8,649,386 B2 * | 2/2014 | Ansari | H04L 12/2836 370/401 |
| 8,970,368 B2 | 3/2015 | Bergman | |
| 9,141,276 B2 | 9/2015 | Dawes | |
| 2004/0204019 A1 * | 10/2004 | Addy | G08B 25/008 455/550.1 |
| 2005/0232186 A1 | 10/2005 | Karaoguz et al. | |
| 2006/0072542 A1 | 4/2006 | Sitmreich et al. | |
| 2008/0042826 A1 * | 2/2008 | Hevia | G08B 25/085 340/531 |
| 2009/0070681 A1 | 3/2009 | Dawes et al. | |
| 2009/0077622 A1 | 3/2009 | Baum et al. | |
| 2009/0233602 A1 | 9/2009 | Hughes | |
| 2010/0277300 A1 * | 11/2010 | Cohn | H04L 69/26 340/506 |
| 2010/0323665 A1 | 12/2010 | Ibe et al. | |
| 2013/0051395 A1 * | 2/2013 | Hansen | G06F 9/54 370/392 |
| 2014/0115142 A1 * | 4/2014 | Peng | H04L 61/2015 709/223 |
| 2014/0156819 A1 | 6/2014 | Cavgalar | |
| 2014/0173692 A1 * | 6/2014 | Srinivasan | H04W 12/02 726/4 |
| 2014/0207707 A1 * | 7/2014 | Na | H04L 65/1033 705/412 |
| 2015/0049189 A1 | 2/2015 | Yau et al. | |
| 2015/0098375 A1 * | 4/2015 | Ree | H04W 52/0229 370/311 |
| 2015/0170506 A1 | 6/2015 | Bergman | |
| 2016/0100023 A1 * | 4/2016 | Kim | H04W 12/04 709/227 |
| 2016/0351036 A1 | 12/2016 | Saldin | |
| 2017/0127124 A9 * | 5/2017 | Wilson | H04L 12/2807 |
| 2019/0141506 A1 | 5/2019 | Saldin | |

\* cited by examiner

600

Determine whether the mobile communications device is operating in a first communications mode or a second communications mode
602

Communicate, in response to determining, that the mobile communications device is operating in the first communications mode, with the wireless security gateway using a local area wireless communications system
604

Detect that the mobile communications device has switched from operating in the first communications mode to operating in the second communications mode
606

Communicate, in response to detecting, the switch from the first communications mode to the second communications mode, with the wireless security gateway using a wide area wireless communications system
608

Stop the communicating with the wireless security gateway using the local area wireless communication system
610

FIG. 6

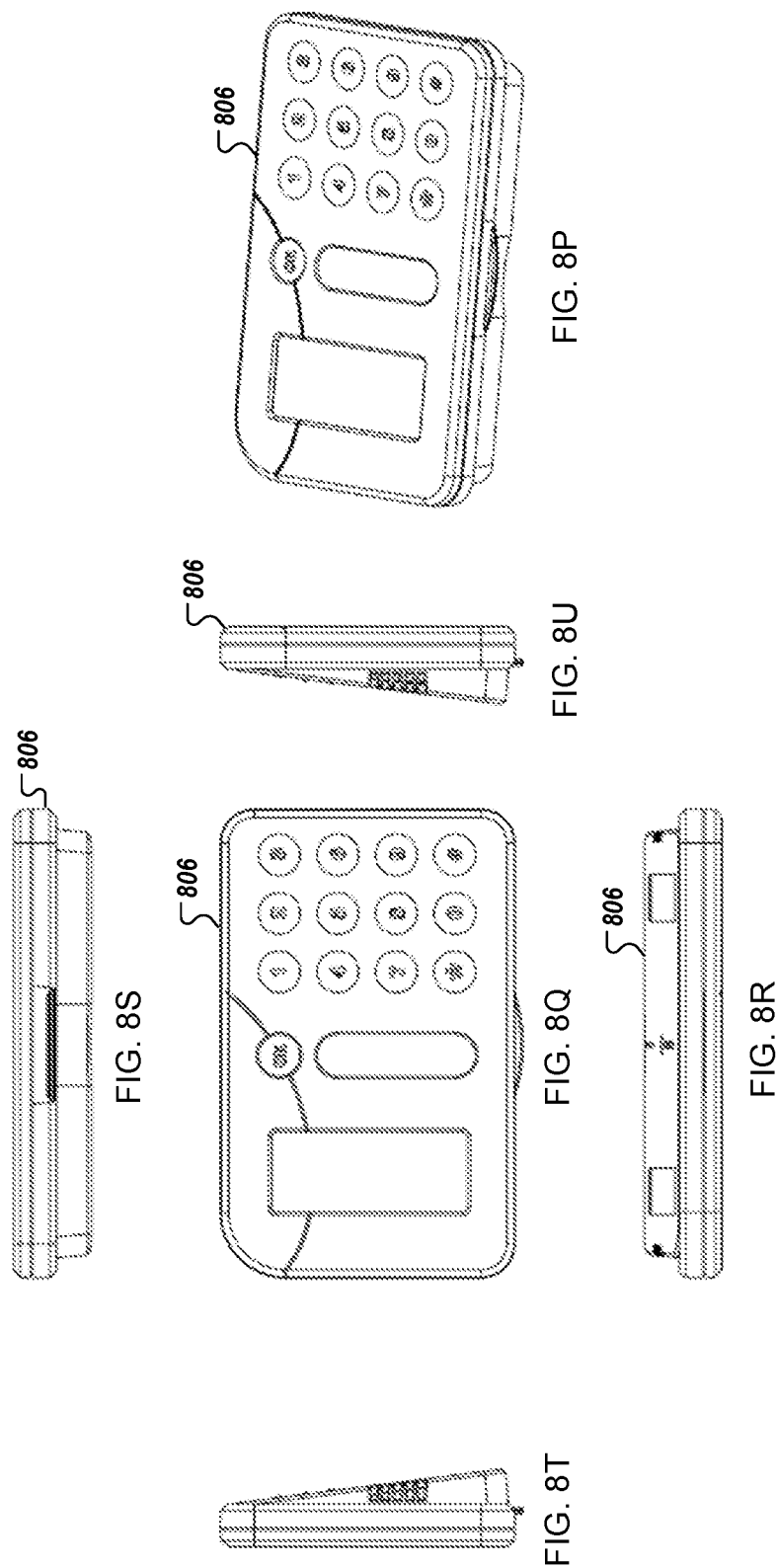

SECURITY SYSTEMS

CLAIM OF PRIORITY

This application is a continuation of U.S. patent application Ser. No. 16/241,619 filed Jan. 7, 2019, which claims priority to U.S. patent application Ser. No. 15/068,265, filed on Mar. 11, 2016, which claims priority to provisional application No. 62/168,569 filed on May 29, 2015, the entire contents of which are hereby incorporated by reference.

TECHNICAL FIELD

This specification generally relates to home security systems.

BACKGROUND

Home security systems have included a control panel that manages communications from sensors distributed throughout the house. That control panel has consisted of a large metal box designed to be installed in a hidden location within the house, such as in the basement or closet, and is often co-located with an electrical services box for the house. Co-locating the control panel with the home electrical services box made configuring power and other electrical and interconnection with communications interfaces for the security system control panel convenient.

In wireless home security systems, distributed sensors can communicate with the control panel wirelessly. The wireless sensors communicate with the control panel, for example, when a state of the sensor has changed, such as a reed switch that has changed state due to a door being opened. In addition, wireless sensors may communicate with the control panel on a periodic basis making what is typically called a "supervisory" transmission, for example, to communicate that the sensor is working properly and that its battery is satisfactory. Depending on the state of the control panel (for example, whether in an "armed state" or not), the control panel determines whether the state information provided to it by the sensors constitutes an alarm condition, and if so, the control panel can be programmed to take the appropriate action, such as sounding a siren, making communications to a remote monitoring system, etc. Wireless security systems have used certain standard frequency bands and often proprietary data transmission protocols. Standard wireless security system frequency bands that have been used were selected because they are optimized for enabling inexpensive, low-current transmitters housed with the distributed sensors. Example standard security system frequencies include 300-500 MHz, 902-928 MHz, and 2.4-2.5 GHz (the latter being the frequency used in ZigBee wireless communications).

In addition, home security systems have also included a user interface/control device specially designed for the security system, and that can be installed in a more readily accessible location within the house than the location for the control panel, for example, by a door of the house or in a bedroom. The security system user interface/control device was typically designed to be powered principally by hard-wire connections, and was designed to communicate with the control panel either over a hard-wired connection or by a wireless transmission. In cases where the user interface/control device was located near a door and that location was not provided with electrical power, electrical power often needed to be provided to that location. In some designs however, the user interface/control device was a battery-operated device which made installation into an existing home less of a burden, and that device would use the same standard security system communication bands to communicate with the control panel that are used by the wireless sensors. But in this case, having a battery-operated user interface/control device imposed the requirement that the batteries in that user interface/control device be changed or charged periodically.

Security system control panels have been designed and configured to communicate with devices and systems that are remote of the premises. In such a security system, the control panel is provided with interface equipment to interface with telephone and other wide-area communications networks, including, for example, land-line telephone systems, cellular communication networks, cable lines, etc. This capability has enabled the security system to communicate alarm conditions at the premises to a remote monitoring service or a device such as a computer or smart phone utilized by the homeowner in a remote location. This capability has also enabled the security system to be controlled from remote, using for example, a telephone, computer, smartphone, etc.

Self-contained control panels have been used that incorporate both a control panel and a user interface/control device in a single device housing. With such self-contained control panels, the control panel device can provide the user interface for system operation and programming system functions, and can be designed and intended to be placed in a readily accessible location within the home, for example, installed on a wall by a door or placed on a table in a convenient location. Such self-contained control panels have smaller form factors due to market preferences, which can make them more susceptible to electrical interference issues between closely-spaced system components, such as high speed microprocessors and antennas.

SUMMARY

Systems, methods and techniques are described herein. In one implementation, a wireless security system premises gateway component includes a first local area wireless communication component adapted to communicate wirelessly with plural wireless security system sensors distributed at a premises; a second local area wireless communication component adapted to communicate wirelessly with a general purpose mobile communications device; a communications interface component adapted to communicate with a wide area communications network that is located remotely of the premises, the communications interface component configured to receive communications originating from the general purpose mobile communications device indirectly via the remotely located wide area communications network; a security system controller component adapted to communicate with the general purpose mobile communications device to provide state information regarding the security system and to provide control inputs to the security system, wherein the security system controller component is adapted to communicate with the general purpose mobile communications device using direct wireless transmissions between the general purpose mobile communications device and the second local area wireless communication component when the general purpose mobile communications device is in communications range of the second local area wireless communications component, and wherein the security system controller component is also adapted and configured to communicate with the general purpose mobile communications device using indirect transmissions carried over the remotely located wide area communications network; and a single gateway housing configured and sized to house the first local area wireless communication component, the second local area wireless communication component, the communications interface component, and the security system controller.

In another implementation, a mobile communications device with one or more processors and memory, the memory storing a downloaded premises security system interface and control application that (i) is executable by the one or more processors of the mobile communications device and (ii) includes security system interface and control module configured to generate communications that are to be communicated to a premises security system gateway component and to process communications transmitted by the premises security system gateway component to the general purpose mobile communications device; communications state module configured to produce an output indicating either a first communications mode is active or a second communications mode is active; and communications module configured to provide the communications between the general purpose mobile communications device and the premises security system gateway component using a local area wireless communications system when the communications state module is indicating the first communications mode is active, the local area wireless communications system providing a direct wireless connection between the general purpose mobile communications device and the premises security system gateway component. The communications module can further be configured to provide the communications between the general purpose mobile communications device and the premises security system gateway component using a wide area wireless communications system when the communications state module is indicating the second communications mode is active, the wide area wireless communications system providing an indirect connection between the general purpose mobile communications device via a wide area communications system network.

In another implementation, a computer-implemented method for providing a premises system interface, the method includes determining, by an application running on a mobile communications device, whether the mobile communications device is operating in a first communications mode or a second communications mode, wherein the first communications mode is used when the mobile communications device is in communications range of a communications component for a wireless security gateway located at a premises, and wherein the second communications mode is used when the mobile communications device is not within the communications range of the communications component for the wireless security gateway; communicating, by the application and in response to determining that the mobile communications device is operating in the first communications mode, with the wireless security gateway using a local area wireless communications system, wherein the local area wireless communications system provides a direct wireless connection between the mobile communications device and the wireless security gateway; detecting, by the application, that the mobile communications device has switched from operating in the first communications mode to operating in the second communications mode; communicating, by the application and in response to detecting the switch from the first communications mode to the second communications mode, with the wireless security gateway using a wide area wireless communications system, wherein the wide area wireless communications system provides an indirect wireless connection between the mobile communications device and the wireless security gateway; and stopping, by the application, the communicating with the wireless security gateway using the local area wireless communication system.

Certain implementations may provide one or more advantages. For example, users can be provided with seamless access to connected devices (e.g., IoT ecosystem) and security system components within a premises regardless of whether they are located at the premises and regardless of the types of network connections (e.g., local area network (LAN), wide area network (WAN)) that are available. In another example, enrollment and access to security system gateways can be controlled and managed locally by the security system gateways, which can eliminate security risks associated with remote management and control.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

Figure 2A:
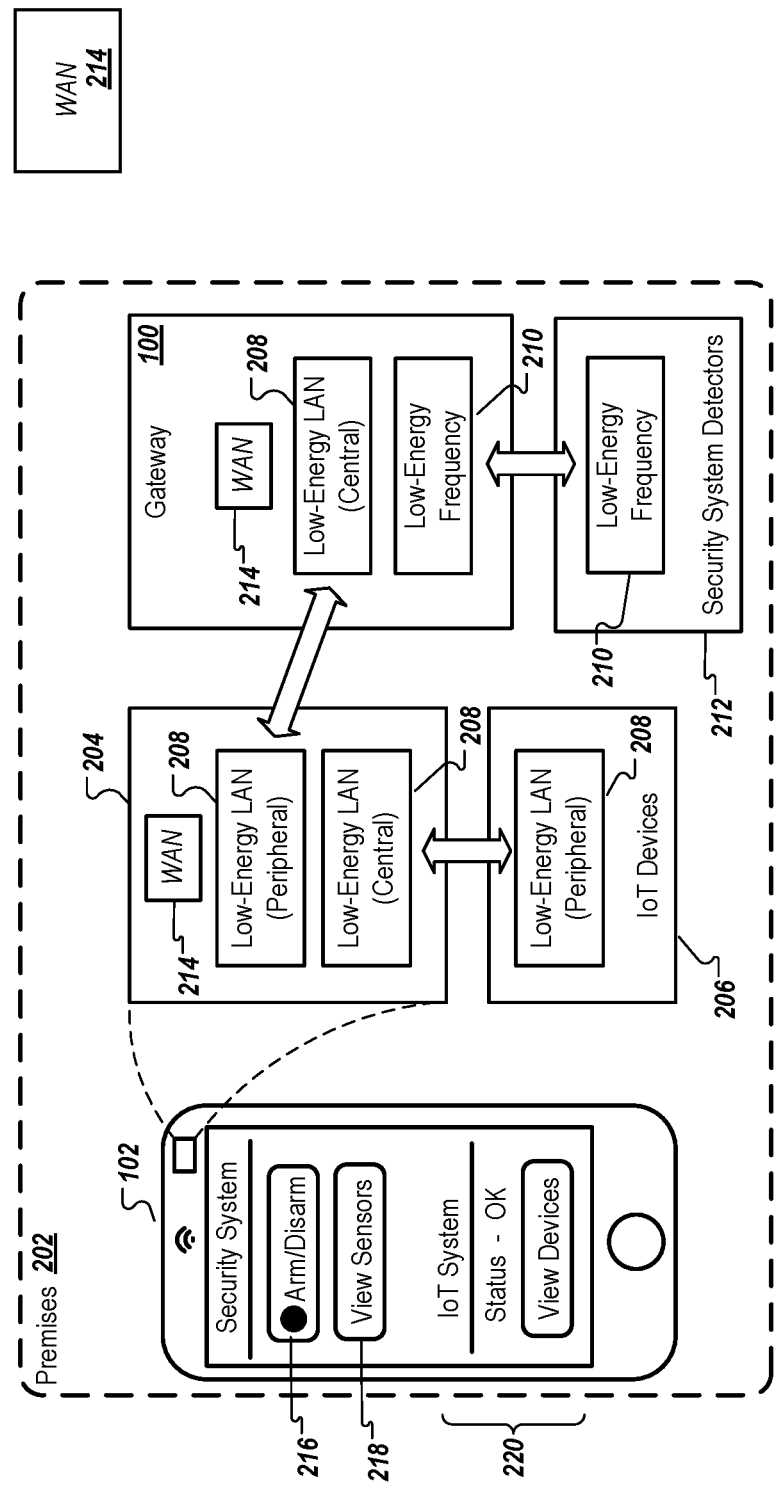
Figure 2B:
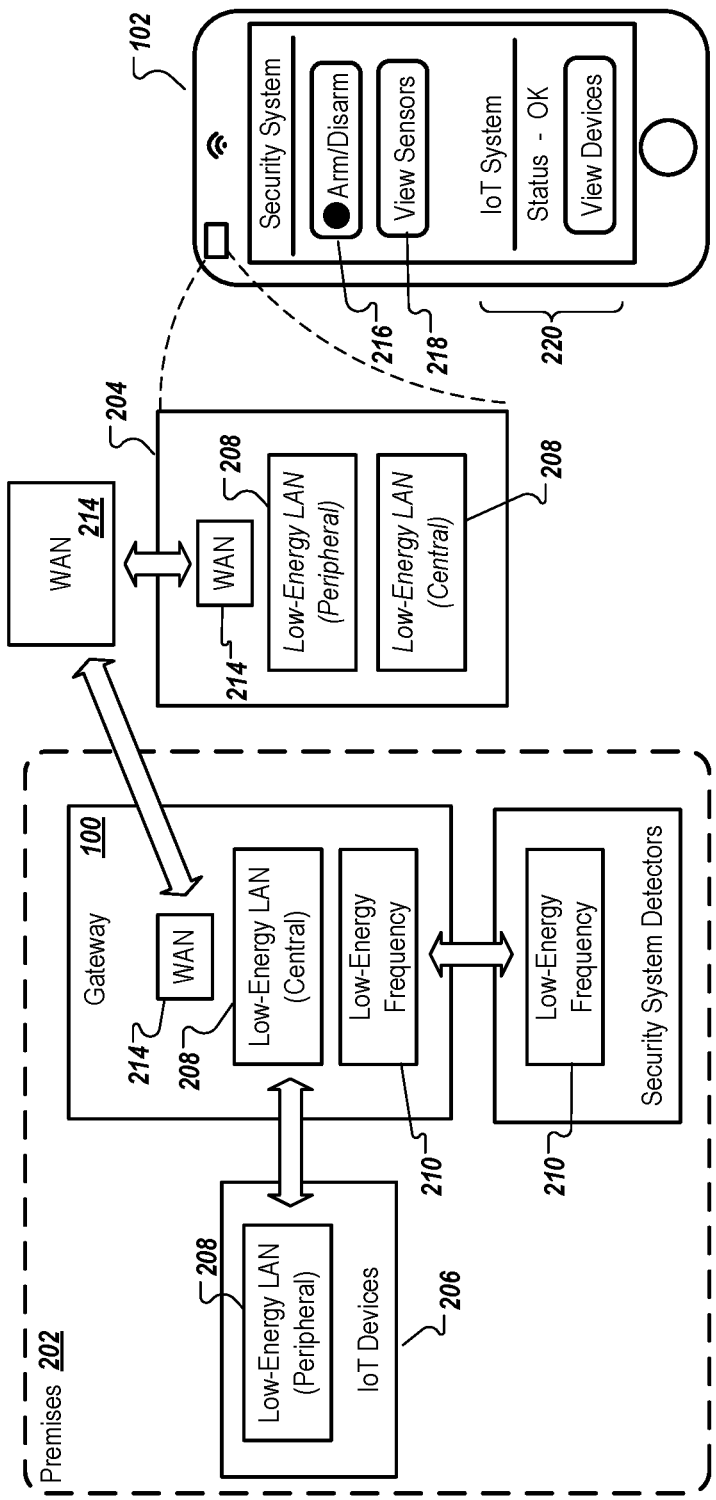

FIGS. 2A-2B collectively illustrate differences in gateway communication using LAN and WAN modes for the mobile device.

Figure 3:
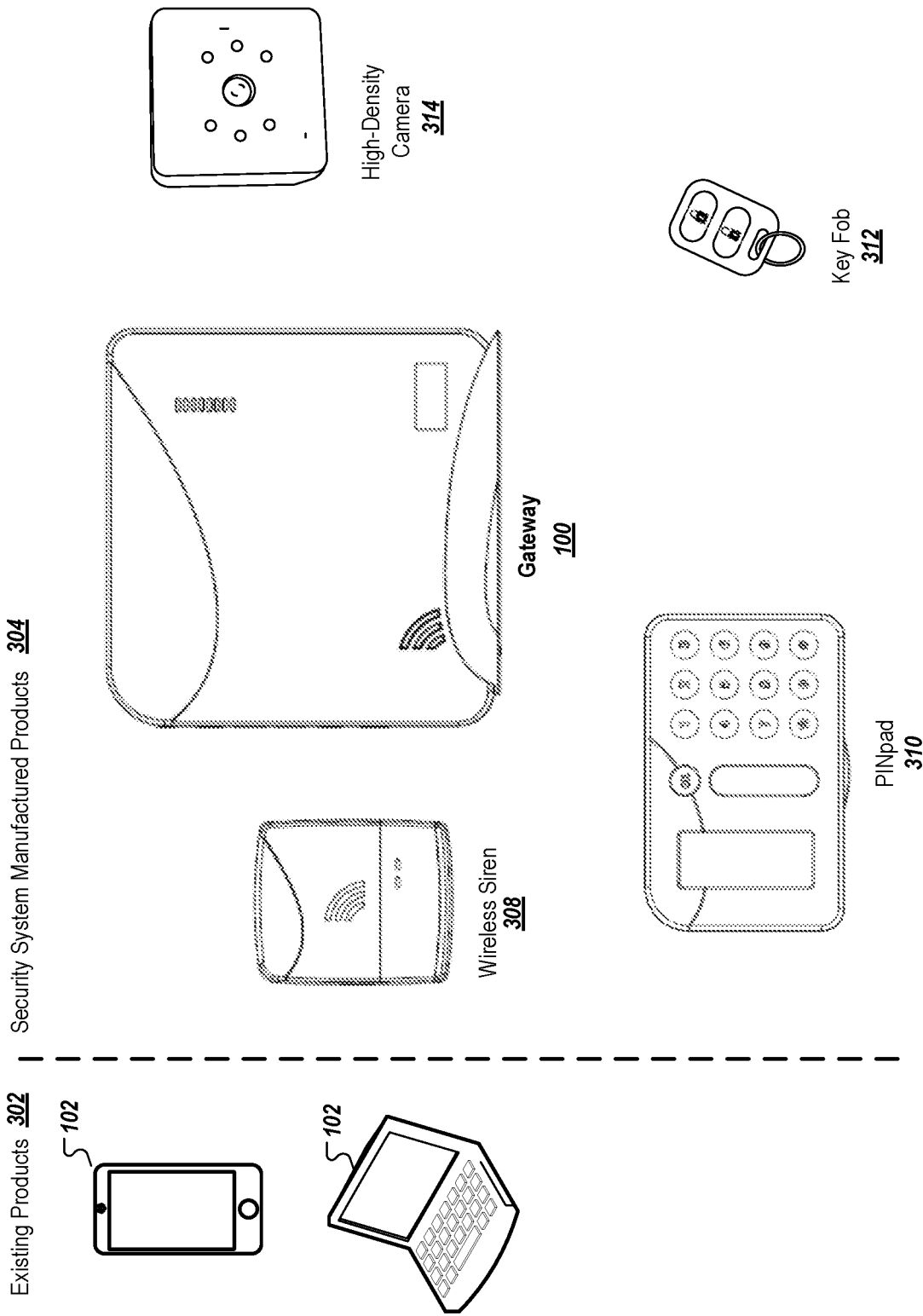

FIG. 3 shows example components of a security system that includes the gateway.

Figure 4:
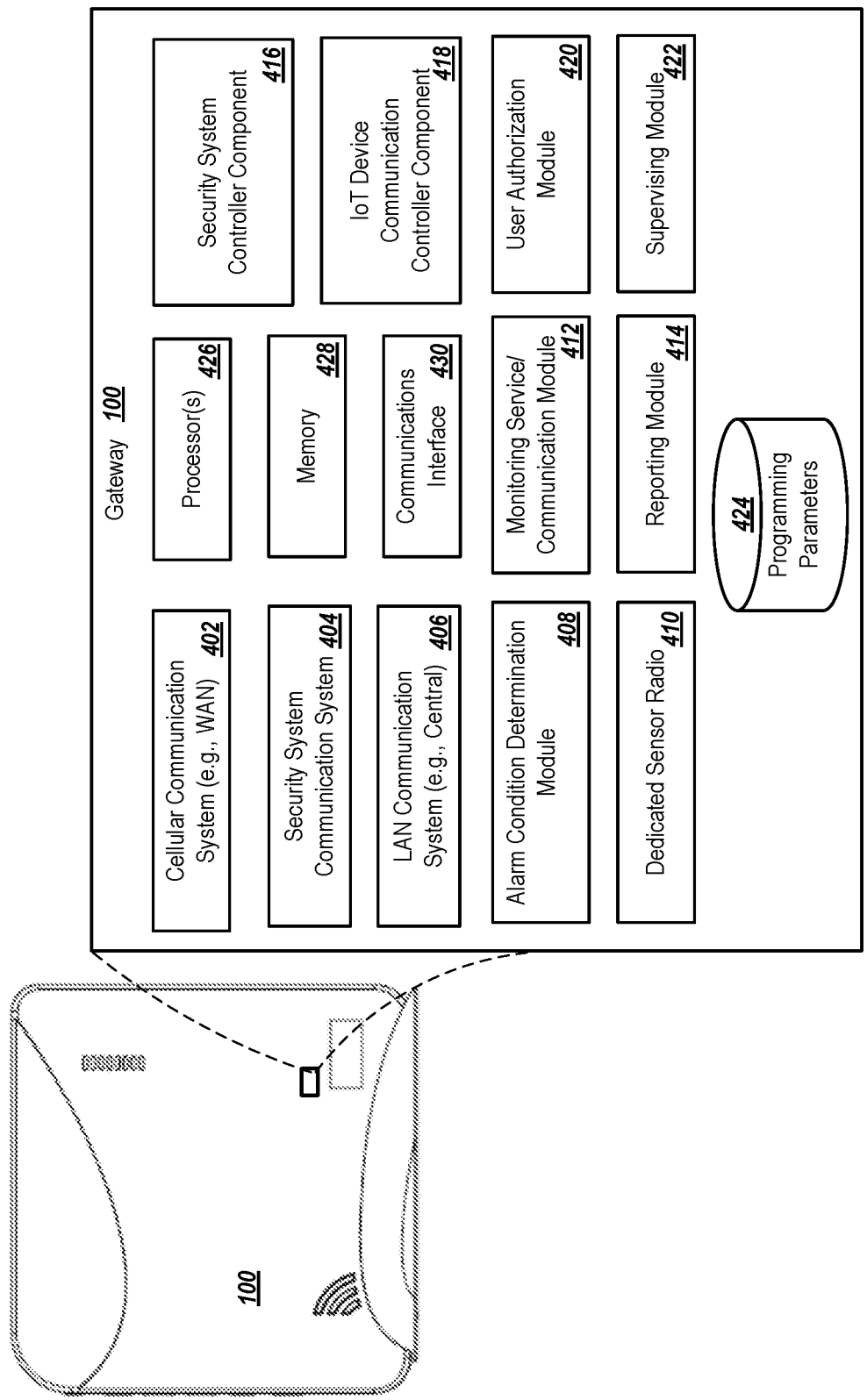

FIG. 4 is a block diagram showing example modules of the gateway.

Figure 5A:
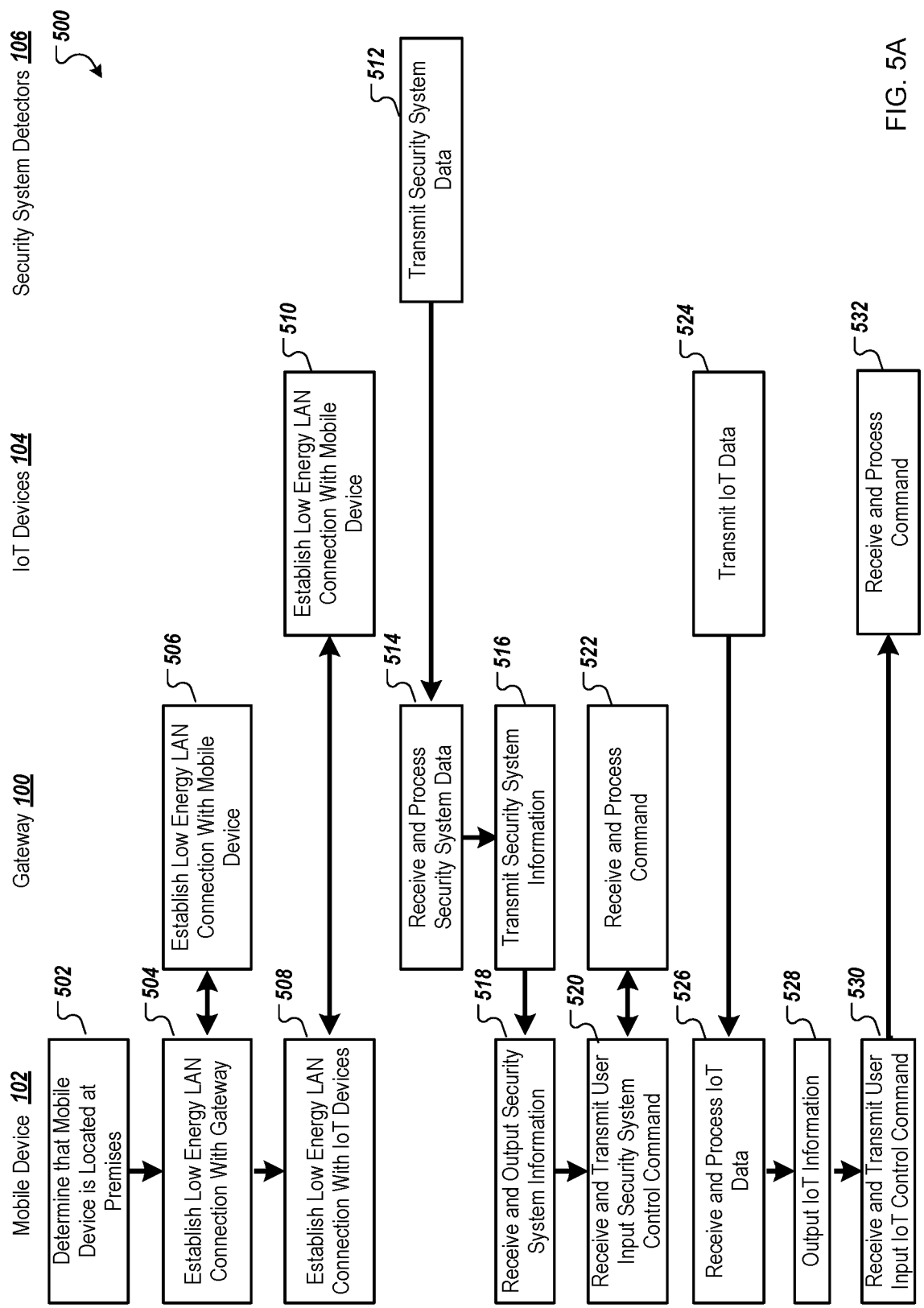

FIG. 5A is a swim lane diagram of an example process for a scenario in which the mobile device is on the premises and uses LAN communications.

Figure 5B:
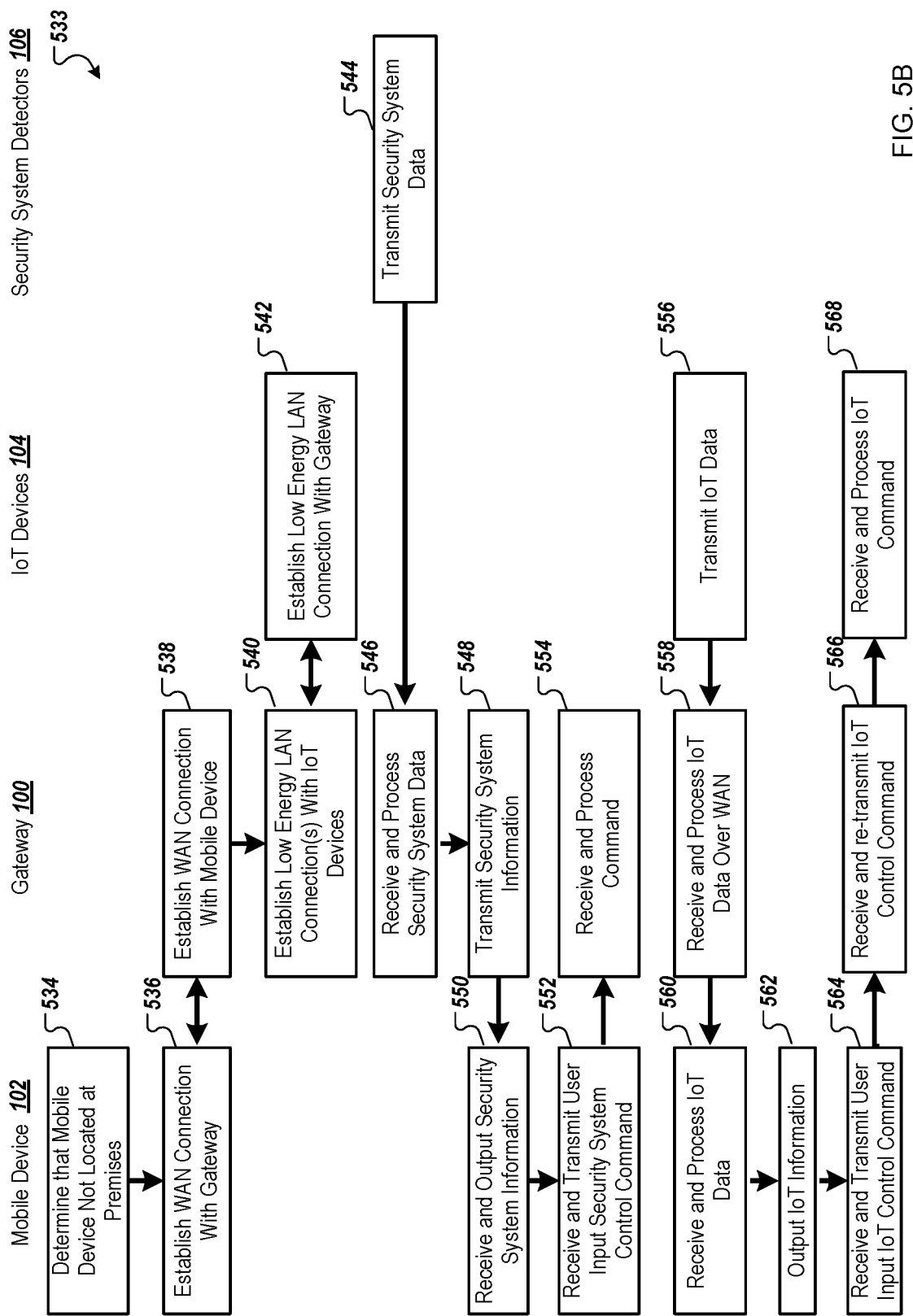

FIG. 5B is a swim lane diagram of an example process for a scenario in which the mobile device is not on the premises and uses WAN communications.

FIG. 6 is a flow diagram of an example process changing from a LAN communication mode to a WAN communication mode.

FIGS. 7A-F depict various views of an example security system gateway.

FIGS. 8A-G depict various views of an example siren component that can be used as part of a security system.

FIGS. 8H-O depict various views of an example pinger device that can be used as part of a security system.

FIGS. 8P-U depict various views of an example touchpad device that can be used as part of a security system.

Figure 9A:
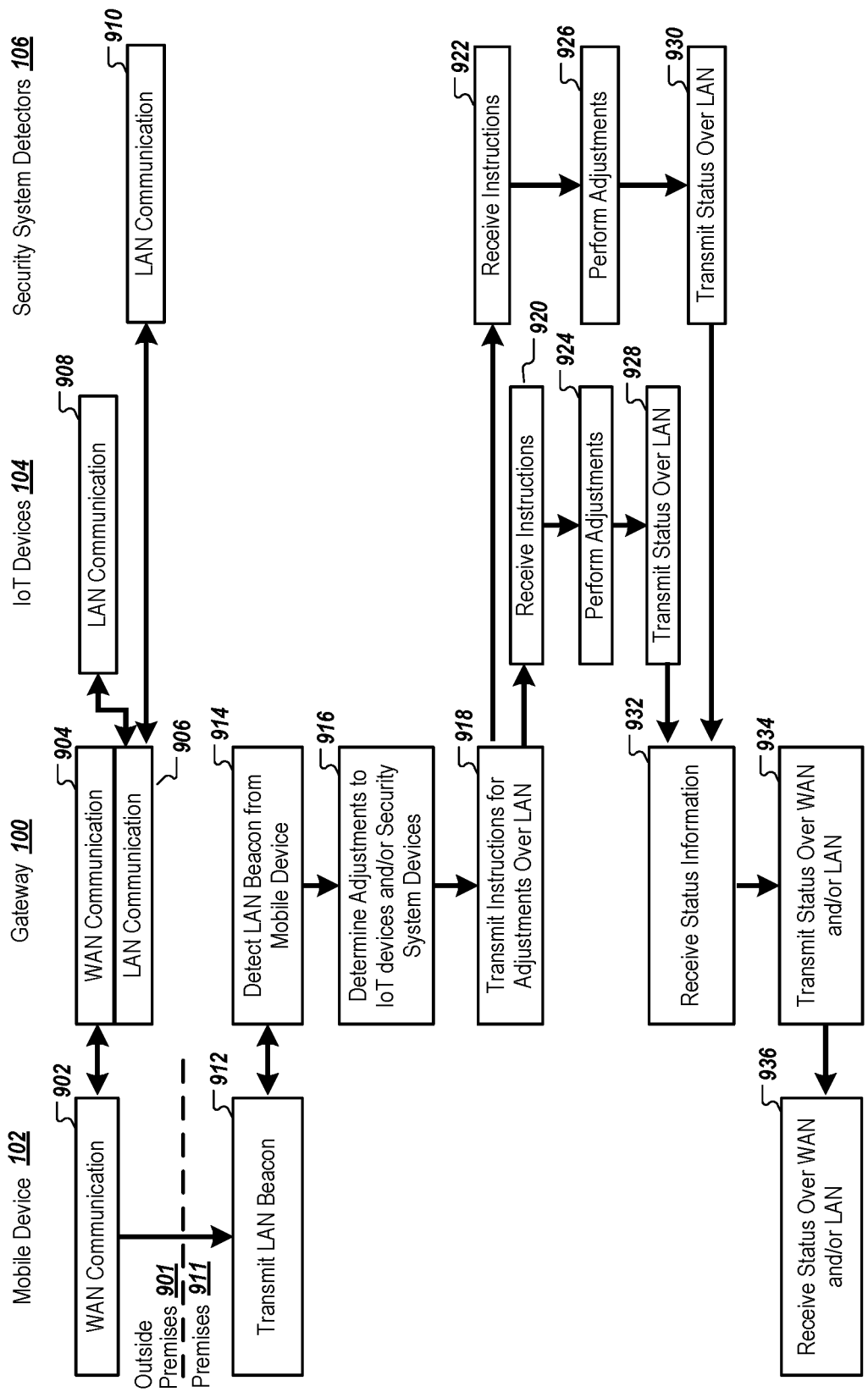
Figure 9B:
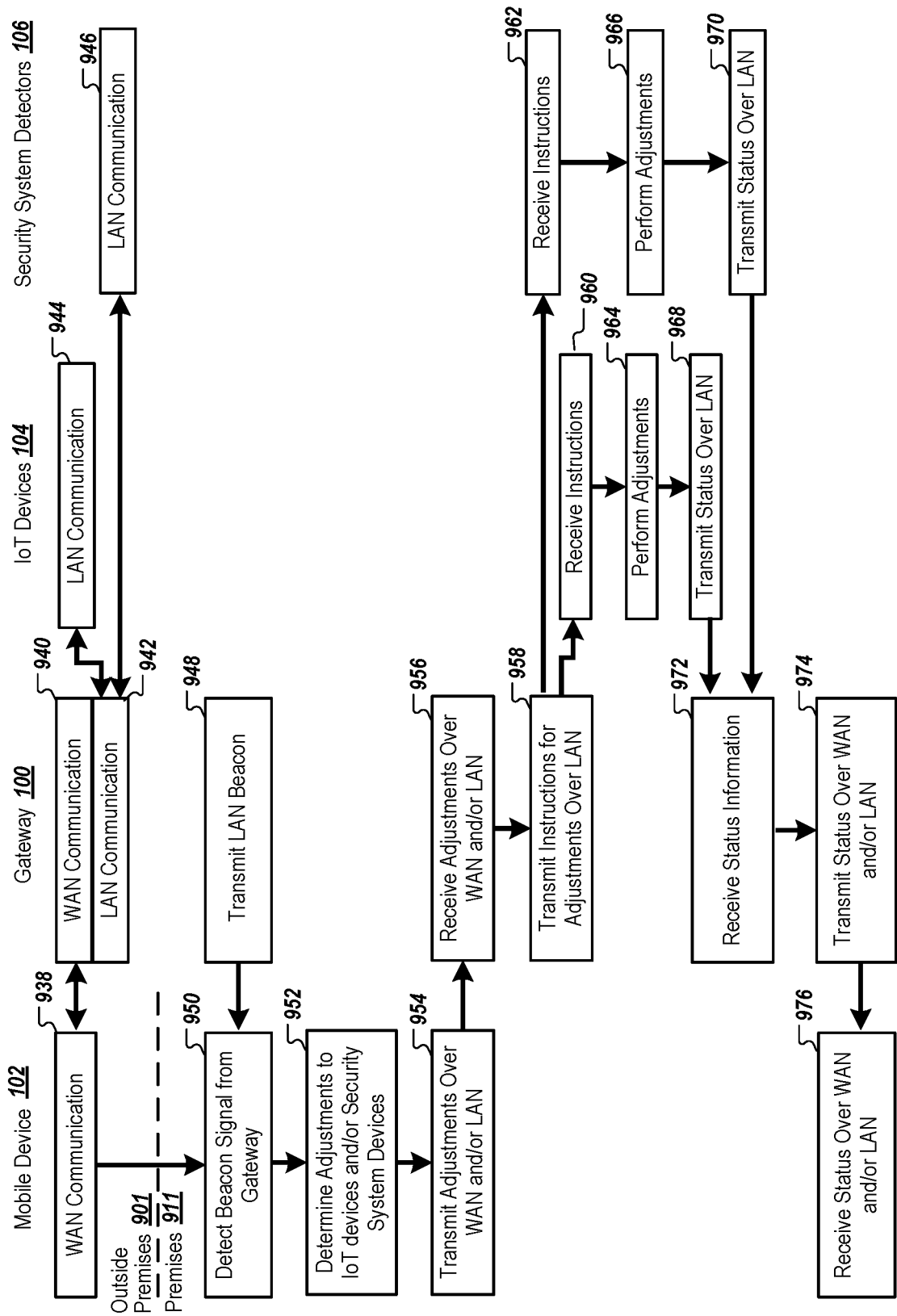

FIGS. 9A-9B are swim lane diagrams of example scenarios of the gateway detecting a mobile device arriving on the premises.

Figure 10A:
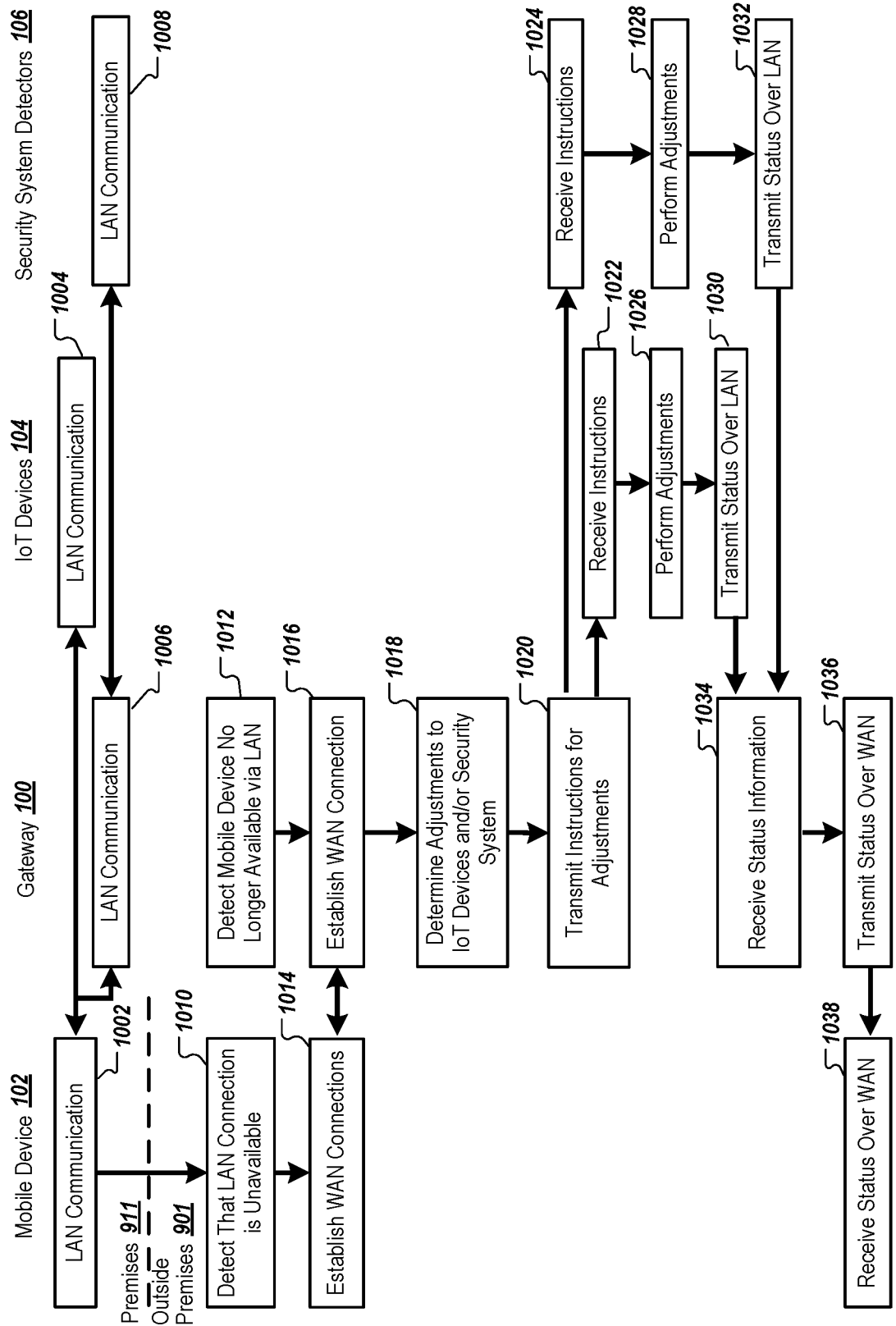
Figure 10B:
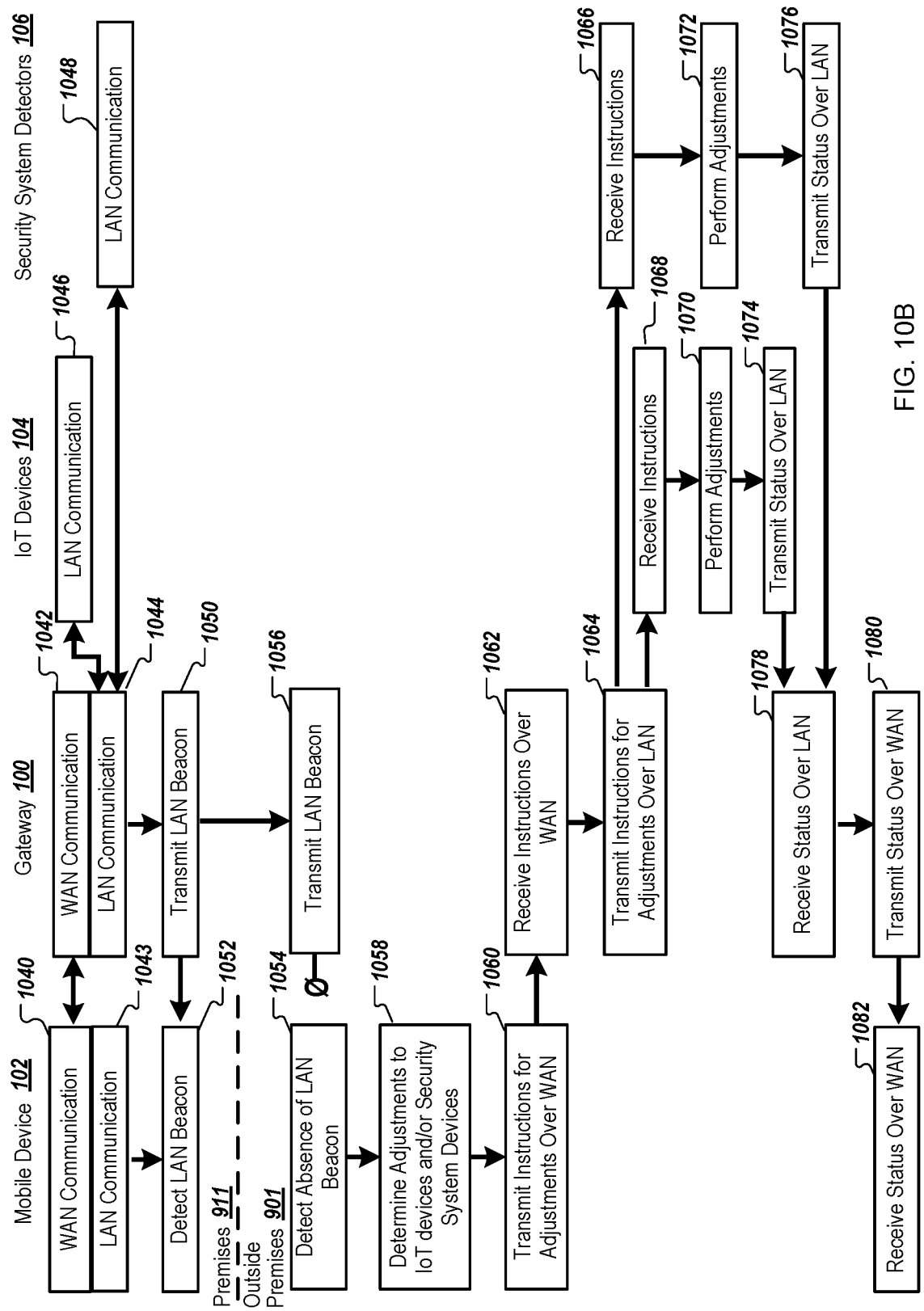

FIGS. 10A and 10B are swim lane diagrams of example scenarios of the gateway detecting the mobile device leaving the premises.

Figure 11A:
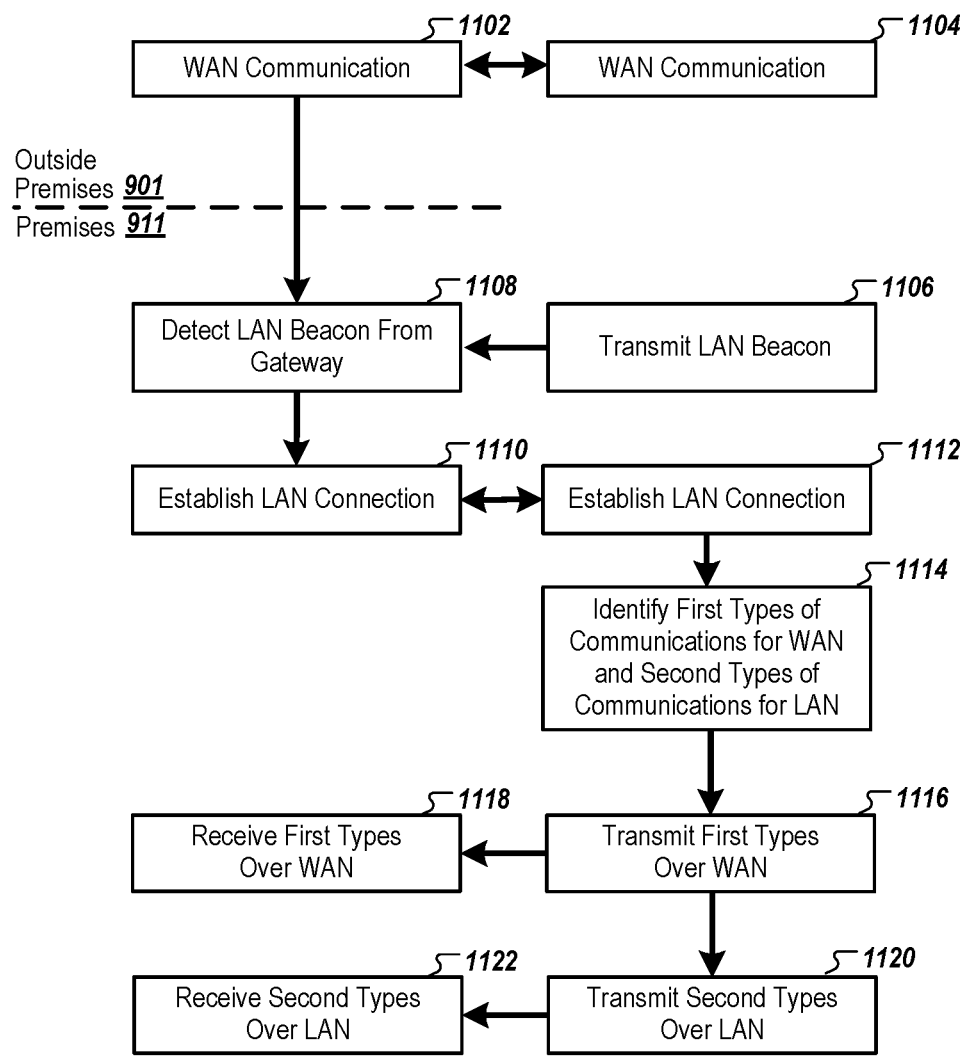
Figure 11B:
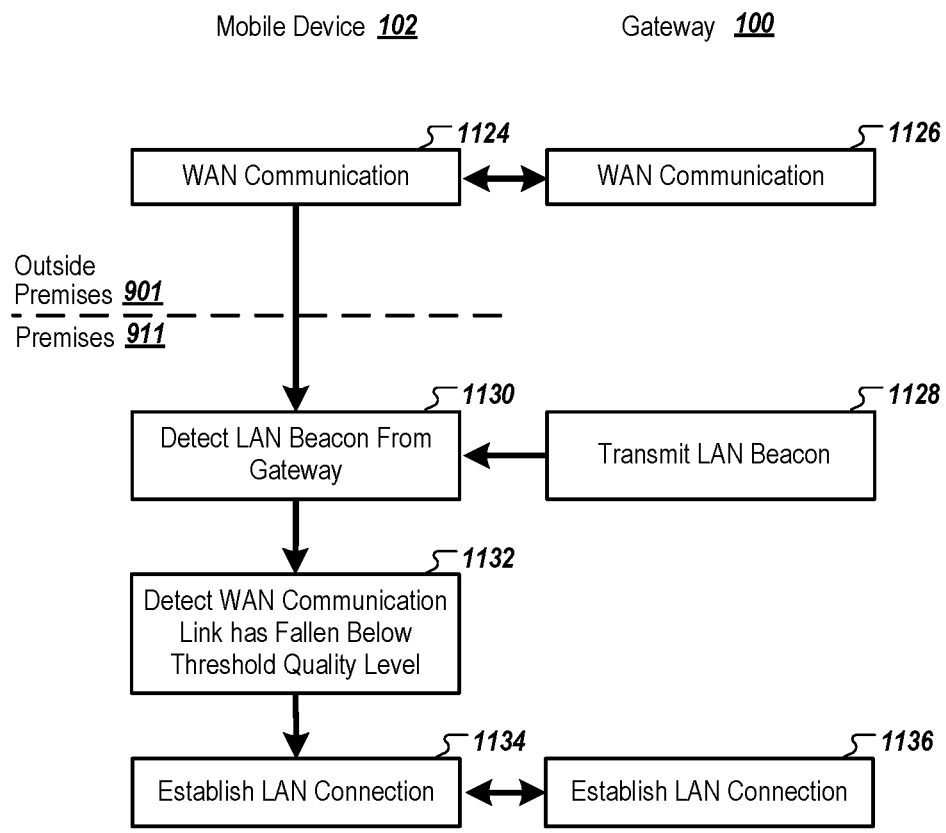

FIGS. 11A-B are swim lane diagrams showing example scenarios of using combinations of WAN and LAN communications on the premises.

Figure 12A:
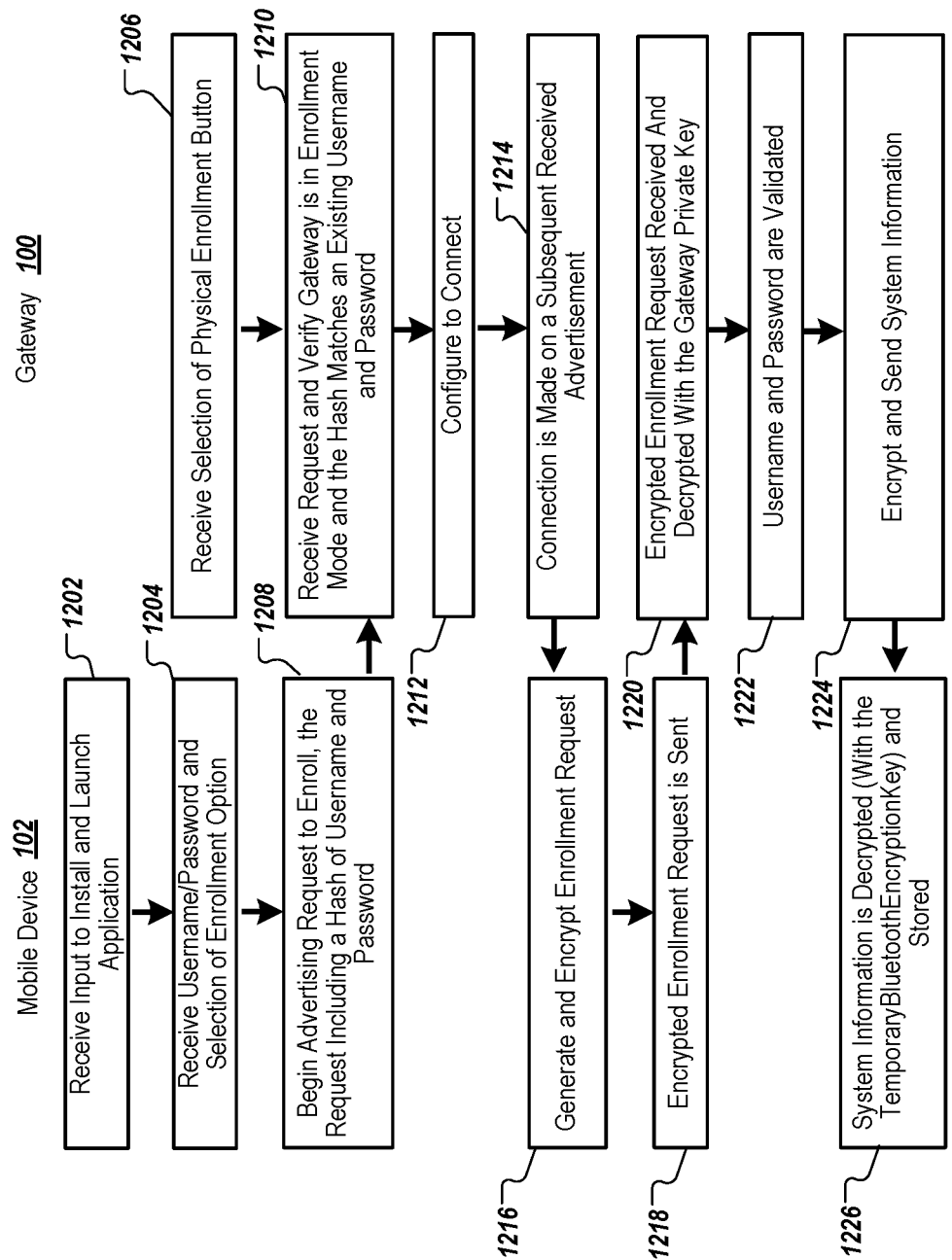
Figure 12B:
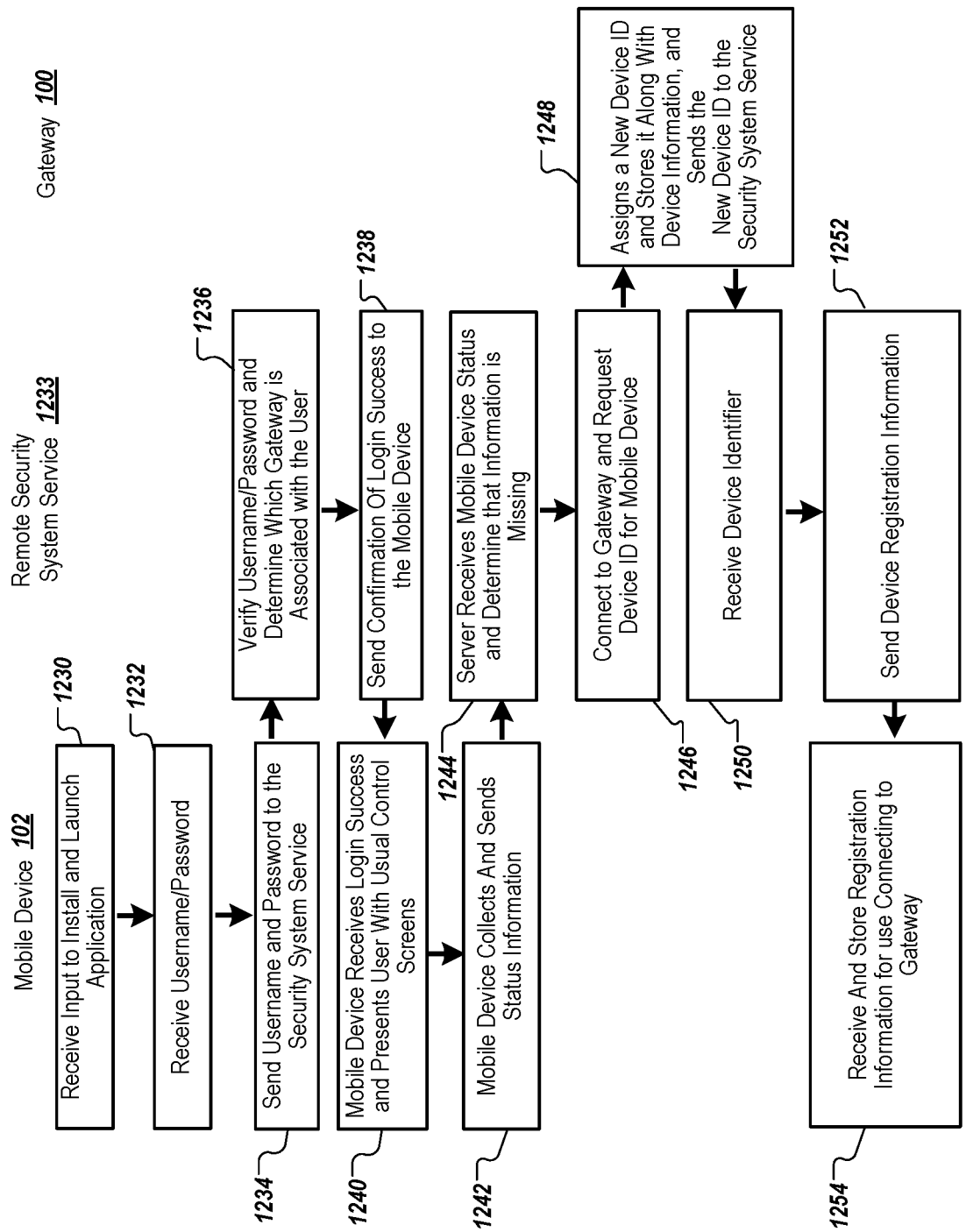

FIGS. 12A and 12B are swim lane diagrams showing example scenarios for enrollment of device with a security system.

Figure 13:
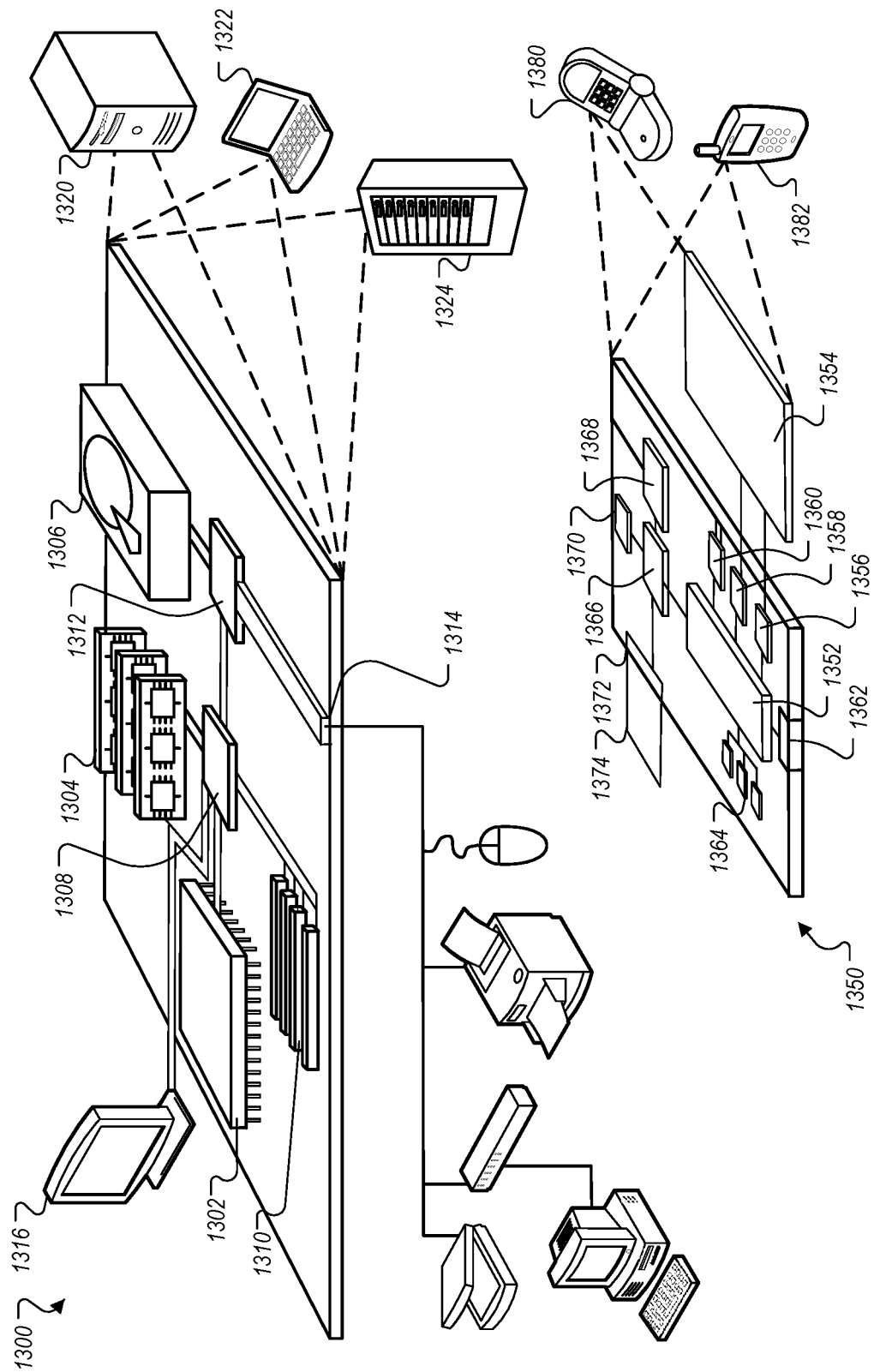

FIG. 13 is a block diagram of an example computer system that can be used to implement the methods, systems and processes described in this disclosure.

Like reference numbers and designations in the various drawings indicate like elements.

DETAILED DESCRIPTION

This document describes systems, devices, techniques, and mechanisms for security systems in which the primary day-to-day user interface is a mobile device that can communicate over a LAN, a WAN, or both as needed, and can additionally interface with both a security system and other systems at a premises, such as an internet of things ("IoT") ecosystem at a premises. IoT ecosystems can include wired and wireless devices that communicate over network connections (e.g., LAN, WAN, internet, wired connections, wireless connections) to provide any of a variety of features, such as remote monitoring (e.g., sensor data feeds) and remote control (e.g., actuation of mechanical and/or electrical devices). Security system gateway devices can be used to provide interfaces between authorized mobile computing devices and an underlying security system, and its component devices, at a premises as well as to one or more IoT ecosystems at the premises, regardless of whether the mobile computing devices are located at or outside of the premises.

Figure 1A:
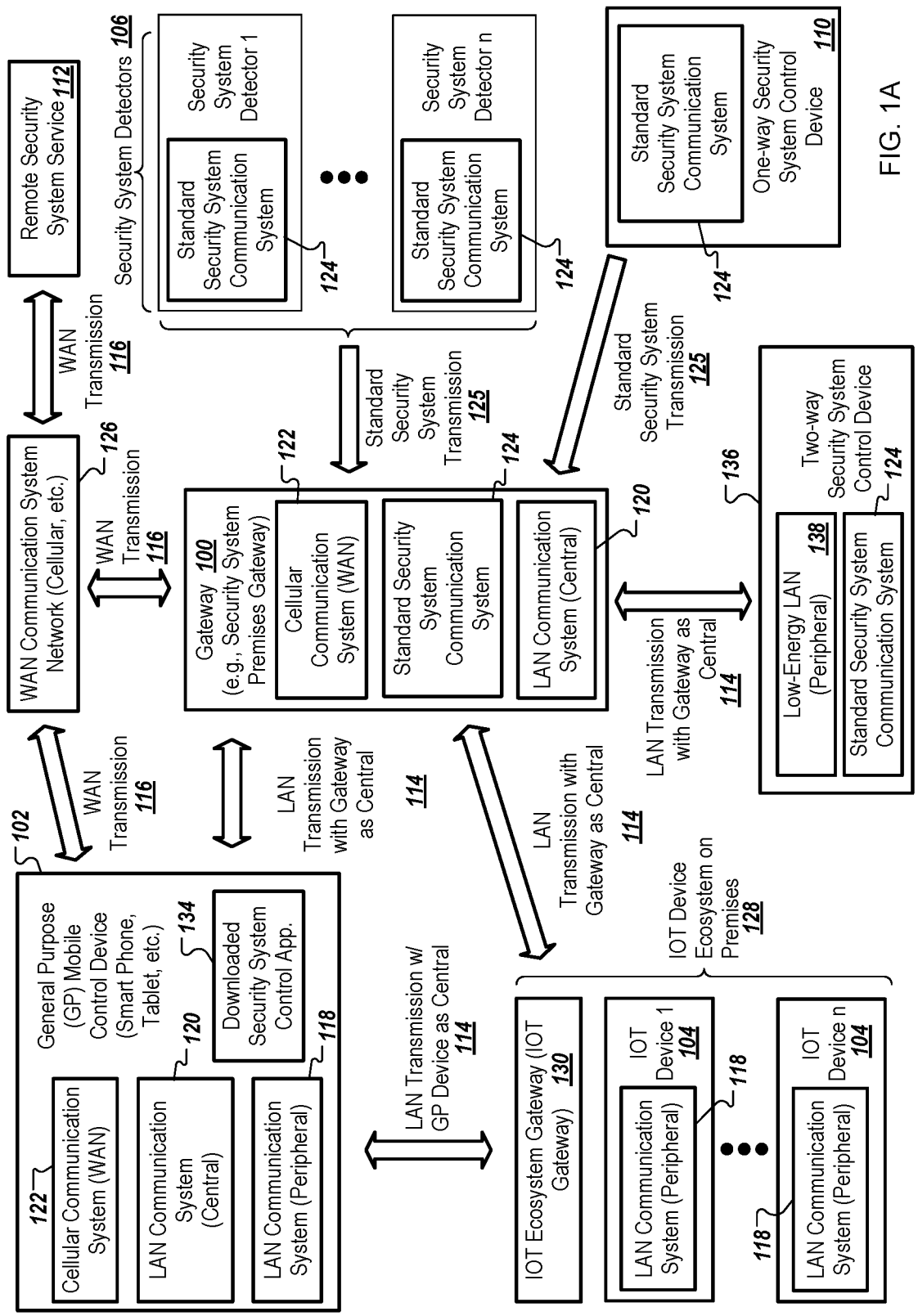
FIG. 1A is a block diagram showing interactions among a gateway and related components.

FIG. 1A is a block diagram showing interactions within an example security system. For example, the security system can include a security system premises gateway (e.g., a gateway 100) and related components. The example gateway 100 can control the security system and can provide an interface for a mobile computing device 102 to access/control the security system and/or an IoT ecosystem. Mobile devices 102 can include, for example, general purpose mobile control devices, including smart phones, tablet computing devices, laptop computers, wearable computing devices, and/or other computing devices that may be mobile. Other types of computing devices can be used as the mobile device 102.

The gateway 100 can communicate with plural components, including IoT devices 104, security system detectors 106, one-way security system control devices 110, and a remote security system service 112. In some implementations, "peripheral" and "central" roles can be played by the devices during LAN communication. For example, when devices communicate over a LAN connection, one of the devices may communicate as a central role that coordinates and manages the communication (e.g., addressing, communications hub) and other devices can communicate in peripheral roles. As such, example roles and situations for the security system described in this document include the gateway 100 communicating as a central with IoT devices 104 acting as peripherals, the gateway 100 communicating as a central with two-way security system control devices 136 acting as peripherals, the gateway 100 communicating as a central with the mobile device 102 acting as a peripheral, and the mobile device 102 communicating as a central with the IoT devices 104 acting as peripherals.

Communications among the gateway 100 and related components can include local area network (LAN) communications 114 and wide area network (WAN) communications 116. LAN communications 114 can be used, for example, among components that are situated in the premises of the gateway 100, including the mobile device 102 when present within a threshold distance of the gateway 100 (e.g., in or near the home or other building(s) in which the gateway 100 is located). Components that communicate over the LAN can include LAN communication systems 118 (peripheral role) and 120 (central role), and a cellular communication system 122 (e.g., WAN). Security system-related components can use a standard security system communication system 124 (e.g., using standard security system transmissions 125). WAN communication between the gateway 100 and the mobile device can be handled using a WAN communication system network 126 (e.g., that service cellular phone networks).

IoT devices 104 can include components in the premises that may or may not be security system-related, such as temperature sensors and controls (including heating and air conditioning), doors, locks, garage doors, appliances, lights, and other systems. In some implementations, the IoT devices 104 can be part of an IoT device ecosystem 128 on the premises. In some implementations, the IoT devices 104 can be controlled and/or interfaced with an IoT ecosystem gateway 130.

In some implementations, communication between the gateway 100 and the mobile device 102 can be handled with a downloaded security system control application 134. The gateway can also communicate with a two-way security system control device 136 (e.g., a keypad) using low-energy LAN communication 138.

In some implementations, LAN communication systems can include Bluetooth low energy (BTLE). Compared to Classic Bluetooth, BTLE can provide considerably reduced power consumption and cost, while maintaining a similar or greater communication range. In addition to BTLE, WiFi can be used as a LAN communication system. LAN communication systems can include low-energy transmission, e.g., to preserve the battery life of a device that is serving as a peripheral in the communication protocol.

In some implementations, standard security system communication systems can be used with wireless security systems. Traditionally, standard communication systems can operate in the 300-500 MHz frequency range, e.g., optimized for an inexpensive, low-current transmission. Other standard security system communication systems, for example, can utilize 900 MHz or 2.4 GHZ bands.

Figure 1B:
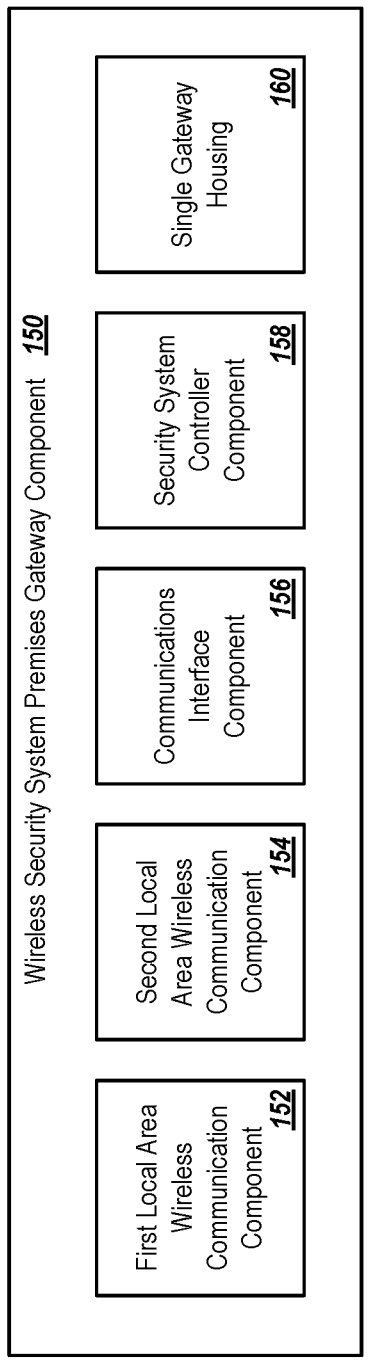
FIG. 1B is a block diagram of an example wireless security system premises gateway component.

FIG. 1B is a block diagram of an example wireless security system premises gateway component 150. For example, the wireless security system premises gateway component 150 can be implemented with the components described herein and can be used for the gateway 100 described above. In some implementations, the wireless security system premises gateway component 150 can include the following components, but additional components are possible.

A first local area wireless communication component 152 can be adapted to communicate wirelessly with multiple wireless security system devices (e.g., sensors, controllers) distributed at a premises (e.g., home, building, office).

A second local area wireless communication component 154 can be adapted to communicate wirelessly with a general purpose mobile communications device (e.g., the mobile device 102). For example, the second local area wireless communication component can be a component that utilizes a Bluetooth low energy protocol. In some implementations, under the Bluetooth low energy protocol, the gateway component can be configured as a central and the general purpose mobile communications device can be configured as a peripheral.

In some implementations, the second local area wireless communication component 154 can be adapted to communicate wirelessly with a two-way user interface and control device specifically designed for use with the security system.

In some implementations, the second local area wireless communication component 154 can be further adapted to communicate wirelessly with a plurality of devices that are located in or around the premises. The plurality of devices can each include one or more of the following: (i) components to monitor and transmit status information and (ii) components that are remotely controllable and manage operation of one or more devices. The wireless security system premises gateway component can further include a local device communication controller that is configured to provide a communication interface between the general purpose mobile communications device and the plurality of devices using indirect transmissions carried over the remotely located wide area communications network.

In some implementations, the plurality of devices can be part of an Internet of things (IoT) ecosystem at or around the premises.

In some implementations, for communication between the gateway component and the plurality of devices, the gateway component can be configured as a central and the plurality of devices can be configured as peripherals.

A communications interface component 156 can be adapted to communicate with a wide area communications network that is located remotely of the premises. The communications interface component 156 can be configured to receive communications originating from the general purpose mobile communications device indirectly via the remotely located wide area communications network.

In some implementations, direct communications between the general purpose mobile communications device and the gateway component using the second local area wireless communication component can be performed under a topology in which the gateway component is configured as a hub (e.g., master or control) and the general purpose mobile communications device is configured as a peripheral (e.g., slave).

A security system controller component 158 can be adapted to communicate with the general purpose mobile communications device to provide state information regarding the security system and to provide control inputs to the security system. The security system controller component 158 can be adapted, for example, to communicate with the general purpose mobile communications device using direct wireless transmissions between the general purpose mobile communications device and the second local area wireless communication component 154 when the general purpose mobile communications device is in communications range of the second local area wireless communications component 154. The security system controller component 158 can also be adapted and configured to communicate with the general purpose mobile communications device using indirect transmissions carried over the remotely located wide area communications network.

A single gateway housing 160 can be configured and sized to house the first local area wireless communication component 152, the second local area wireless communication component 154, the communications interface component 156, and the security system controller component 158.

In some implementations, the gateway component does not include a display component providing a graphical user interface or textual user interface. For example, user interface and display functionality can be provided through the mobile device 102.

FIGS. 2A-2B collectively illustrate differences in gateway communication using LAN and WAN modes for the mobile device 102. For example, FIG. 2A shows LAN communication between the mobile device 102 and the gateway 100 when the mobile device 102 is within a premises 202 (e.g., in or near a home or other location in which the gateway 100 is installed). FIG. 2B, for example, includes WAN communication between the mobile device 102 and the gateway 100 when the mobile device 102 is outside the premises 202.

Referring to FIG. 2A, the mobile device 102 includes communications modules 204 for communicating with the gateway 100 and IoT devices 206. For example, communication between the mobile device 102 and the gateway 100 can use low-energy LAN communications 208 (e.g., BTLE, Wi-Fi). In some implementations, the mobile device 102 can act as central in communications with the IoT devices 206, which communicate as peripherals with the mobile device 102. Also, the gateway 100 can act as central in communications with the mobile device 102, which can communicate as a peripheral with the gateway 100. Low-energy communication 210 (e.g., 300-400 MHz) can be used between the gateway 100 and the security system detectors 212. WAN communication 214, depicted in FIG. 2A using italics, is not used in the example configuration shown in FIG. 2A, e.g., with the mobile device 102 on the premises. However, as described below, WAN communication 214 may be used in addition and/or alternative to LAN communication 208 when the mobile device 102 is located in or near the premises 202.

Referring to FIG. 2B, as the mobile device 102 is outside the premises 202, WAN communication 214 is used for communications between the mobile device 102 and the gateway 100. In the configuration shown in FIG. 2B, the low-energy LAN communications 208 included in the communication modules 204 are depicted using italics, as LAN communication by the mobile device 102 is not used.

In some implementations, the user interface of the mobile device 102 can include typical security system displays and controls, as shown in FIGS. 2A and 2B. The gateway 100 and the interfaces it provides to the mobile device 102 can permit the interface to be the same on the mobile device 102 regardless of whether the mobile device 102 is located at the premises or outside the premises, and regardless of the type of connection (LAN/WAN) to the gateway. For example, an arm/disarm control 216 can be used to arm and disarm the gateway 100, respectively. A view sensors control 218, for example, can allow the user to display additional information regarding security sensors that are monitored by the gateway 100. IoT controls 220 can allow the user to view the current status of IoT devices that are controlled by the gateway 100 or view information for individual IoT devices. Other interface features and controls are also possible. By using the mobile device 102 in this way as the user interface for the security system, the interface and the user's experience can be the same regardless of whether the user is at or outside the premises, as indicated by the interface being the same across FIGS. 2A and 2B.

FIG. 3 shows example components of a security system that includes the gateway 100. For example, the components can include existing products (e.g., various types of mobile devices 102) that can be programmed to interface with the gateway 100, and security system manufactured products 304. For example, in addition to the gateway 100, the security system manufactured products 304 can include a wireless siren 308 that can sound one or more alarms, depending on detected events, a PINpad 310 for entering commands (in addition to commands entered by the mobile device 102), a Key Fob 312 for communicating with the gateway 100, and a high-density camera 314 connected to the gateway 100 for capturing video and still image, all compatible with the gateway 100. Other components, such as various types of sensors, sound recording devices, proximity pingers (e.g., for children or elderly) are possible.

FIG. 4 is a block diagram showing example modules 402-424 of the gateway 100. For example, a cellular communication system 402 can enable the gateway 100 to communicate with external devices over a WAN connection, such as with the mobile device 102 and Internet resources (e.g., a central registration site for security systems and associated mobile devices). A security system communication system 404, for example, can allow the gateway 100 to communicate with security system components, such as sensors, alarms and other components. A LAN communication system 406 can include hardware and software/firmware (e.g., drivers) for the gateway 100 to communicate over the LAN. An alarm condition determination module 408, for example, can use information received from peripherals and other devices controlled/connected with the gateway 100 to determine the condition of the alarms, such as being in alarmed mode, having failure-related issues, or for other reasons. A dedicated sensor radio 410, for example, can include proprietary and/or commercial components that facilitate continuously listening for transmissions by sensors and/or other tracked components.

A monitoring service/communication module 412, for example, can manage communication for the gateway 100 using one or more of the communication systems 402, 404, and 406, and can monitor the status of various peripheral devices that are communicating or otherwise transmitting information that is detected by the gateway 100. A reporting module 414, for example, can generate reports that include information associated with the security system, including dates and times of specific events, such as arming/disarming, occupation times by registered users and/or devices, security incidents, and other information. A security system controller component 416, for example, can control the day-to-day operation of the security system, including monitoring for alarm conditions and performing actions based on information received from components of the security system. An IoT device communication controller component 418, for example, can communicate with IoT devices (e.g., non-security-related devices) that are interfaced with the security system in addition to components normally considered security-related. A user authorization module 420, for example, can handle and process user inputs (e.g., from a mobile device) that are associated with the registration of new users/devices, and verify user authorization during use of the security system. A supervising module 422, for example, can perform supervisory activities (e.g., track and measure timing of transmissions) associated with components that are controlled by the gateway 100.

A data store of programming parameters 424, for example, can include information for authority levels, arming levels, mapping and other information. For example, the programming parameters 424 can identify people who are authorized to arm/disarm the security system at specific times, identify times and days of the week that the security system is to be armed and at what level, identify users and circumstances for which notifications are to be sent, among other parameters. The gateway 100 (and its components) can include one or more processor(s) 426 for executing instructions (e.g., application code), memory 428 for storing information, and a communications interface 430 for communicating with other components. Other modules of the gateway 100 are possible.

FIG. 5A is a swim lane diagram of an example process 500 for a scenario in which the mobile device 102 is on the premises and uses WAN communications. For example, the process 500 can be performed, in part, by the gateway 100, the mobile device 102, one or more IoT devices 104, and one or more security system detectors 106. In some implementations, interactions associated with the IoT devices 104 can be omitted, e.g., if there are no IoT devices 104 in communication with the gateway 100. Steps for other components can be included within the process 500, e.g., if the other components are in communication with the gateway 100.

At 502, a determination is made that the mobile device 102 is located at premises, such as using GPS capabilities of the mobile device 102 and determining proximity to the gateway 100. Other ways of determining proximity can be used.

At 504, the mobile device 102 can establish a low energy LAN connection with the gateway 100. At 506, the gateway 100 can establish a low energy LAN connection with the mobile device 102. In some implementations, either one of the mobile device 102 or the gateway 100 can initiate establishing the connection. At 508, the mobile device 102 can establish low energy LAN connections with one or more of the IoT devices 104. At 510, the IoT devices 104 can establish a low energy LAN connection with the mobile device 102.

At 512, the security system detectors 106 can transmit security system data to the gateway 100, such as if a sensor has been tripped (e.g., motion or vibration has been detected), an event has occurred, or a status is being provided. At 514, the gateway 100 can receive and process the received security system data, e.g., to perform an action based on the received information.

Interactions associated with the gateway 100 and one or more security system detectors 106 can occur, for example. At 516, the gateway 100 can transmit security system information (e.g., an alarm is sounding) to the mobile device 102. At 518, the mobile device 102 can receive and output the received security system information, such as by displaying information on the screen of the mobile device 102 or by sending a text message. Other forms of communication are possible. At 520, the mobile device 102 can receive and transmit a user input security system control command, such as a command entered by the user to clear the sounding alarm or some other action. At 522, the gateway 100 can receive and process the command.

In another example, interactions associated with IoT devices can occur. At 524, the IoT devices 104 can transmit IoT data to the mobile device 102, such as if a respective IoT device 104 has encountered. At 526, the mobile device 102 can receive and process the IoT data. At 528, the mobile device 102 can output IoT information, e.g., for use by the mobile device 102, such as for presentation on a display. The user, for example, can make a decision to perform an action is response to the received information, and the action can take the form of user input and/or selection of controls on the mobile device 102. At 530, the mobile device 102 can receive and transmit a user input IoT control command to the IoT devices 104. At 532, the IoT devices 104 can receive and process the command, e.g., to reset, to close down, to reboot, to change setting, or perform some other action.

FIG. 5B is a swim lane diagram of an example process 533 for a scenario in which the mobile device 102 is not on the premises and uses WAN communications. For example, the process 533 can be performed, in part, by the gateway 100, the mobile device 102, one or more IoT devices 104, and one or more security system detectors 106. In some implementations, interactions associated with the IoT devices 104 can be omitted, e.g., if there are no IoT devices 104 in communication with the gateway 100. Steps for other components can be included within the process 533, e.g., if the other components are in communication with the gateway 100. The process 533 can be similar to the process 500, except that WAN communication is used between the mobile device 102 and the gateway 100, which affects how processing is to occur for the security system.

At 534, a determination is made that the mobile device 102 is not located at premises, such as detecting the absence of a wireless beacon signal from the gateway 100 or losing the LAN connection and/or using GPS capabilities of the mobile device 102 and determining that the location is a threshold distance away from the gateway 100.

At 536, the mobile device 102 can establish a WAN connection with the gateway 100. At 538, the gateway 100 can establish a WAN connection with the mobile device 102. In some implementations, either one of the mobile device 102 or the gateway 100 can initiate establishing the WAN connection. At 540, the gateway 100 can establish low energy LAN connections with one or more of the IoT devices 104. In some instances, in low energy LAN (and particularly in BTLE) a traditional connection may not be needed for a peripheral to convey data to a central. For example, a BTLE thermometer can transmit temperature information to the gateway 100 and/or the mobile device 102. At 542, the IoT devices 104 can establish a low energy LAN connection with the mobile device 102.

At 544, the security system detectors 106 can transmit security system data to the gateway 100, such as if a sensor has been tripped (e.g., motion or vibration has been detected), an event has occurred, or a status is being provided. At 546, the gateway 100 can receive and process the received security system data, e.g., to perform an action based on the received information.

Interactions associated with the gateway 100 and one or more security system detectors 106 can occur, for example. At 548, the gateway 100 can transmit security system information (e.g., an alarm is sounding) to the mobile device 102. At 550, the mobile device 102 can receive and output the received security system information, such as by displaying information on the screen of the mobile device 102 or by sending a text message. Other forms of communication are possible. At 552, the mobile device 102 can receive and transmit a user input security system control command, such as a command entered by the user to clear the sounding alarm or some other action. At 554, the gateway 100 can receive and process the command. Steps 548-554, for example, can be similar to the steps 516-522 described above with reference to FIG. 5A.

In another example, interactions associated with IoT devices can occur. At 556, the IoT devices 104 can transmit IoT data to the gateway 100, which can, at step 558, receive and process IoT data over the WAN, and forward IoT data to the mobile device 102. At 560, the mobile device 102 can receive and process the IoT data. At 562, the mobile device 102 can output IoT information, e.g., for use by the mobile device 102, such as for presentation on a display. The user, for example, can make a decision to perform an action is response to the received information, and the action can take the form of user input and/or selection of controls on the mobile device 102. At 564, the mobile device 102 can receive and transmit a user input IoT control command to the gateway 100, which, at 566, can forward the command to the IoT devices 104. At 568, the IoT devices 104 can receive and process the command, e.g., to reset, to close down, to reboot, to change setting, or perform some other action. Other sequences of steps are possible in the process 533.

FIG. 6 is a flow diagram of an example process 600 changing from a LAN communication mode to a WAN communication mode. For example, the process 600 can be performed by a mobile computing device, such as the mobile device 102, which can include a premises system interface.

At 602, a determination is made, by an application running on a mobile communications device, whether the mobile communications device is operating in a first communications mode or a second communications mode. For example, an application running on the mobile device 102 can determine whether the mobile device 102 is running in LAN mode or WAN mode. The first communications mode (e.g., LAN mode) is used when the mobile communications device (e.g., the mobile device 102) is in communications range of a communications component (e.g., the LAN communication system 120) for a wireless security gateway (e.g., the gateway 100) located at a premises. The second communications mode (e.g., WAN mode) is used when the mobile communications device (e.g., the mobile device 102) is not within the communications range of the communications component (e.g., the LAN communication system 120) for the wireless security gateway (e.g., the gateway 100).

In response to determining that the mobile communications device is operating in the first communications mode, the application communicates with the wireless security gateway (e.g., the gateway 100) using a local area wireless communications system (e.g., the LAN communication system 120). The local area wireless communications system provides a direct wireless connection between the mobile communications device (e.g., the mobile device 102) and the wireless security gateway (e.g., the gateway 100).

Detection is made that the application that the mobile communications device (e.g., the mobile device 102) has switched from operating in the first communications mode (e.g., LAN mode) to operating in the second communications mode (e.g., WAN mode).

In response to detecting the switch from the first communications mode to the second communications mode, the application communicates with the wireless security gateway (e.g., the gateway 100) using a wide area wireless communications system (e.g., the WAN communication system network 126). The wide area wireless communications system provides an indirect wireless connection between the mobile communications device (e.g., the mobile device 102) and the wireless security gateway (e.g., the gateway 100).

The communicating with the wireless security gateway (e.g., the gateway 100) using the local area wireless communication system (e.g., the LAN communication system 120) is stopped by the application.

Figure 7F:
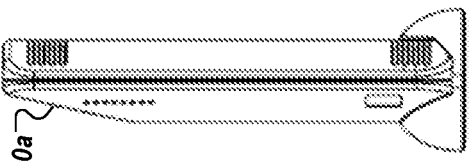
Figure 7C:
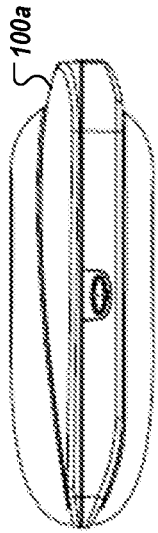
Figure 7A:
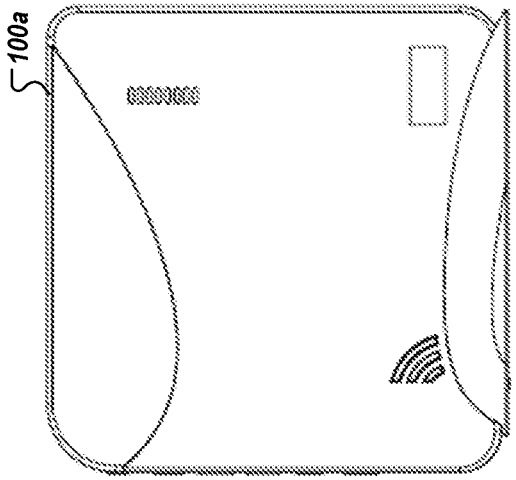
Figure 7D:
Figure 7B:
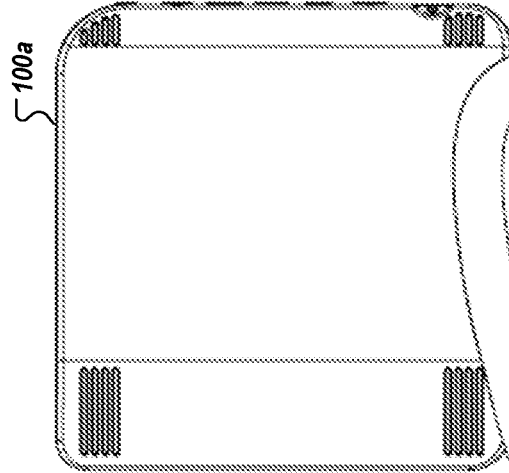
Figure 7E:
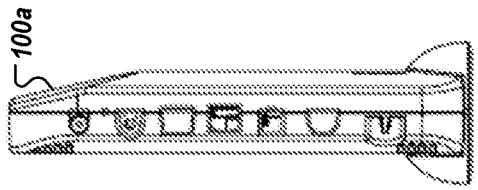

FIGS. 7A-F depict various views of an example security system gateway 100a. For instance, FIG. 7A depicts a front view of the example gateway 100a, FIG. 7B depicts a back view of the example gateway 100a, FIG. 7C depicts a top view of the example gateway 100a, FIG. 7D depicts a bottom view of the example gateway 100a, and FIGS. 7E-F depict side views of the example gateway 100a. As shown in FIGS. 7A-F, the example gateway 100a may not include a user interface, such as a graphical user interface, to program or otherwise control operation of the gateway 100a. The gateway 100a can include one or more physical buttons, such as buttons depicted in FIG. 7E, that can be pressed by a user to place the gateway 100a into various modes of operation, such as a mode through which users can enroll their devices with the gateway 100a. The gateway 100a can also include one or more lights (e.g., LEDs) that can provide status information for the gateway 100a, such as status information indicating that the gateway 100a is on, connected to WAN, in enrollment mode, and/or that an alarm condition has been detected.

Figure 8B:
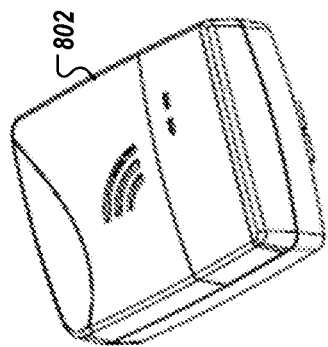
Figure 8G:
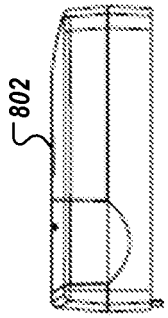
Figure 8D:
Figure 8E:
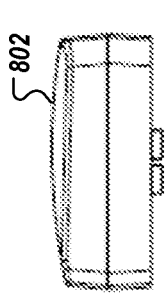
Figure 8C:
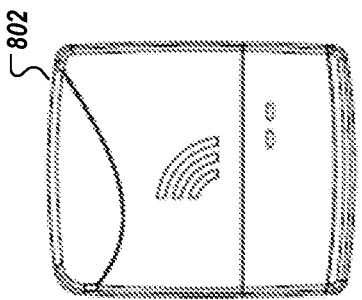
Figure 8A:
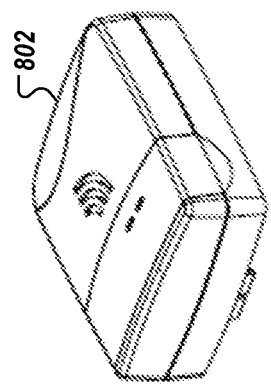
Figure 8F:
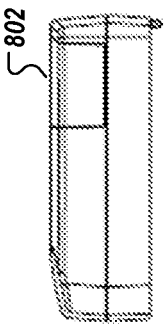

FIGS. 8A-G depict various views of an example siren component 802 that can be used as part of a security system. The example siren component 802 can, for example, wirelessly communicate with the security system gateway 100 and can output information (e.g., alarms, instructions) to users as instructed by the security system gateway 100. The siren component 802 can be similar to the one-way security system control device 110 described above with regard to FIG. 1A. FIGS. 8A-B depict three-dimensional perspectives of the example siren component 802, FIG. 8C depicts a front view of the example siren component 802, FIG. 8D depicts a back view of the example siren component 802, FIG. 8E depicts a bottom view of the example siren component 802, and FIGS. 8F-G depict side views of the example siren component 802.

Figure 8H:
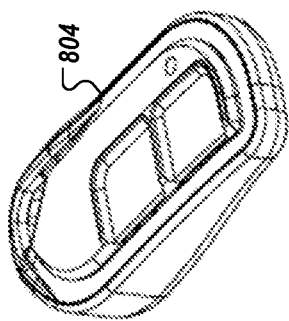
Figure 8O:
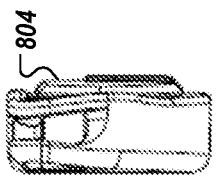
Figure 8I:
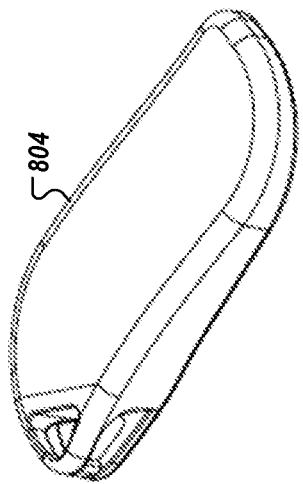
Figure 8M:
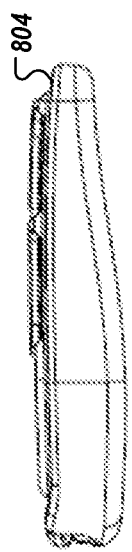
Figure 8J:
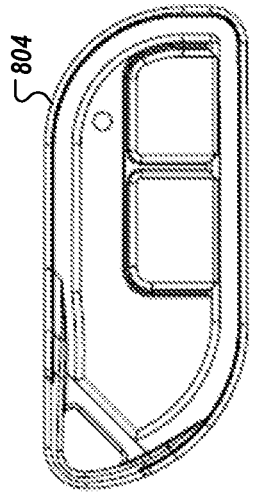
Figure 8L:
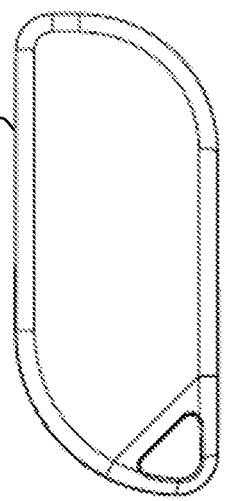
Figure 8K:
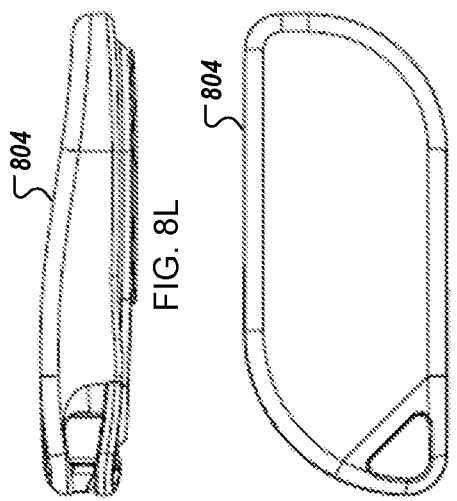
Figure 8N:
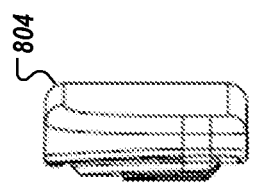

FIGS. 8H-O depict various views of an example pinger device 804 that can be used as part of a security system. The example pinger 804 can, for example, wirelessly communicate with the security system gateway 100 to passively provide information (e.g., pings), which can indicate the presence of an associated user, and to actively provide information (e.g., button press), which can indicate one or more inputs from a user (e.g., emergency, disarm command, arm command, unlock command). The pinger 804 can be similar to the one-way security control device 110 described above with regard to FIG. 1A. FIGS. 8H-I depict perspective views of the example pinger device 804, FIG. 8J depicts a top view of the pinger device 804, FIG. 8K depicts a bottom view of the pinger device 804, FIGS. 8L-M depict side views of the pinger device 804, FIGS. 8N-O depict end views of the pinger device 804.

FIGS. 8P-U depict various views of an example touchpad device 806 that can be used as part of a security system. The example touchpad device 806 can be programmed to receive and display information from a security system gateway (e.g., the gateway 100), to receive user input, and to transmit information (e.g., user commands, passwords) to the gateway 100. The example touchpad 806 can include any of a variety of appropriate technologies to output information, to receive user input, and to communicate with the gateway 100. For example, the touchpad 806 can use low-power displays, such as electronic ink displays (e.g., electrophoretic displays, electrowetting displays), and can use input features such as physical buttons and/or touch-based features (e.g., capacitive touch sensors). As depicted in the example views of the touchpad device 806, multiple output and input features (some of which may overlap/be the same) can be provided. The example touchpad device 806 can be, for example, similar to the two-way security system control device 136 described above with regard to FIG. 1A.

FIG. 8P depicts a three-dimensional perspective of the example touchpad device 806, FIG. 8Q depicts a front view of the example touchpad device 806, FIG. 8R depicts a top view of the example touchpad device 806, FIG. 8S depicts a bottom view of the example touchpad device 806, and FIGS. 8T-U depict end views of the example touchpad device 806.

FIGS. 9A-9B are swim lane diagrams of example scenarios of the gateway detecting a mobile device arriving on the premises. For example, in FIG. 9A, the gateway 100 can detect the arrival of the mobile device 102 and perform various actions (e.g., disarming the security system, opening blinds) in response. In FIG. 9B, for example, the mobile device 102 can, on its own, detect its arrival on the premises and instruct actions to be performed. The swim lane diagrams illustrate actions performed by the gateway 100, the mobile device 102, one or more IoT devices 104, and one or more security system detectors 106.

Referring to FIG. 9A, communication modes can already be in effect, for example, when the mobile device 102 is outside the premises 901, before arriving on the premises. At 902, WAN communication is already established at the mobile device 102. At 904, WAN communication is already established at the gateway 100. At 906, 908 and 910, respectively, LAN communication is already established at the gateway 100, the IoT devices 104, and the security system detectors 106.

In some implementations, communication may not automatically switch over from WAN to LAN just because the LAN is available. For example, if the WAN communication is functioning correctly and there is no need or advantage to switch to LAN communication, the WAN communication can continue. Further, LAN and WAN communication between the mobile device 102 and the gateway 100 can occur simultaneously, e.g., to handle different types of information.

The mobile device 102 can arrive on the premises 911. At 912, the mobile device 102 can transmit a LAN beacon for detection by the gateway 100 (the mobile device 102 may continually and/or intermittently transmit such LAN beacons, but a beacon signal may first be detected by the gateway 100 when the device 102 arrives at the premises). At 914, the gateway 100 can detect the LAN beacon received from the mobile device 102. In some implementations, both the mobile device 102 and the gateway 100 can transmit LAN beacons, which can be detected by the other device and used by both devices 102 and 100 to confirm the presence of the mobile device 102 at the premises.

In some implementations, a pinger device can be used in conjunction with the security system and, when carried by the user, serve as a redundant mobile device. In some implementations, the pinger can be used to notify the presence of the user (e.g., for specific, pre-determined events occurring in the security system), such as when the mobile device 102 is turned off and/or when an application linked to the security system is not executing.

Upon detection of the LAN beacon by the gateway 100, various actions can be initiated by the gateway 100. For example, at 916, adjustments to IoT devices and/or security system devices are determined by the gateway 100 in response to the device 102 being determined to have arrived at the premises (e.g., a state for the device 102 changing from remote to local). At 918, instructions for the adjustments are transmitted over LAN. At 920, the instructions are received by the IoT devices 104. At 922, the instructions are received by the security system detectors 106. At 924 and 926, respectively, the IoT devices 104 and the security system detectors 106 can perform the adjustments. At 928 and 930, respectively, the IoT devices 104 and the security system detectors 106 transmit status over LAN that indicates that the adjustments have been made. At 932, the status information is received by the gateway 100.

As soon as various actions are performed and associated completion status is received by the gateway 100, notification to the user can commence. At 934, the status can be transmitted over WAN and/or LAN by the gateway 100. At

936, the status can be received over WAN and/or LAN by the mobile device 102, e.g., for presentation to the user.

In some implementations, switching to LAN communication may not occur simply because the LAN is available. Rather, communication may continue with the WAN, even if the user has arrived on the premises 901.

Referring to FIG. 9B, for example, the mobile device 102 can detect its arrival on the premises, and it can determine and instruct actions to be performed. For example, this differs from FIG. 9A in which the gateway 100 detects the arrival of the mobile device 102.

As similarly described above for FIG. 9A, various communication modes can already be in effect, for example, when the mobile device 102 is outside the premises 901, before arriving on the premises. At 938, WAN communication is already established at the mobile device 102. At 940, WAN communication is already established at the gateway 100. At 942, 944 and 946, respectively, LAN communication is already established at the gateway 100, the IoT devices 104, and the security system detectors 106.

At 948, a LAN beacon is transmitted by the gateway 100. At 950, a beacon signal transmitted by the gateway 100 is detected at the mobile device 102. At 952, in response to detecting the beacon signal the mobile device 102 can determine adjustments to IoT devices and/or security system devices, e.g., using the application on the mobile device 102. At 954, adjustments are transmitted by the mobile device 102 over the WAN and/or the LAN. At 956, adjustments are received over the WAN and/or the LAN by the gateway 100.

At 958, instructions for the adjustments are transmitted over LAN. At 960, the adjustments are received by the IoT devices 104. At 962, the instructions are received by the security system detectors 106. At 964 and 966, respectively, the IoT devices 104 and the security system detectors 106 perform the adjustments. At 968 and 970, respectively, the IoT devices 104 and the security system detectors 106 transmit status over LAN that indicates that the adjustments have been made. At 972, the status information is received by the gateway 100.

As soon as various actions are performed and associated completion status is received by the gateway 100, notification to the user can commence. At 974, the status can be transmitted over WAN and/or LAN by the gateway 100. At 976, the status can be received over WAN and/or LAN by the mobile device 102, e.g., for presentation to the user.

In some implementations, hybrid scenarios can exist that are combinations of the scenarios described above with reference to FIGS. 9A and 9B. For example, each the mobile device 102 and the gateway 100 can transmit LAN beacons (e.g., at steps 912 and 948, respectively). Further, the beacon signals can be detected at the other side (e.g., at steps 914 and 950, respectively) and can be used by either side individually and/or both sides in combination to verify that the mobile device 102 is located at the premises 911. For example, the mobile device 102 can communicate detection of the beacon signal from the gateway 100 over a LAN and/or WAN connection with the gateway 100, and the gateway 100 can confirm the presence of the mobile device 102 at the premises 911 based on detecting a beacon signal from the mobile device 102 and receiving the communication over the LAN and/or WAN of the gateway 100's beacon signal being detected by the mobile device 102. Adjustments to the security system can be determined on either side, e.g., the mobile device 102 or the gateway 100, at steps 952 or 916, respectively. Regardless of the communication between the mobile device 102 and the gateway 100, the gateway 100 can transmit the instructions to the IoT devices 104 and the security system detectors 106.

FIGS. 10A and 10B are swim lane diagrams of example scenarios of the security system detecting the mobile device 102 leaving the premises 911. For example, in FIG. 10A, the gateway 100 can detect that the mobile device 102 has left the premises and can perform some actions in response. In FIG. 10B, for example, the mobile device 102 can detect its own departure and can instruct actions to be performed.

Referring to FIG. 10A, communication modes can already be in effect, for example, while the mobile device 102 is inside the premises 911 and just before leaving the premises. For example, at 1002, 1004, 1006, and 1008, LAN communication is already established at the mobile device 102, the IoT devices 104, the gateway 100, and the security system detectors 106, respectively.

At 1010, for example, the LAN connection can be detected to be unavailable, such as by the application executing on the mobile device 102. At 1012, the gateway 100 can detect that the mobile device 102 is no longer available via the LAN. As the LAN connection is no longer available, at 1014 and 1016, respectively, the mobile device 102 and the gateway 100 can establish a WAN connection.

At 1018, adjustments to IoT devices and/or security system devices are determined by the gateway 100 in response to detecting that the mobile device 102 has left the premises. At 1020, instructions for the adjustments are transmitted over LAN. At 1022 and 1024, respectively, the instructions are received by the IoT devices 104 and the security system detectors 106. At 1026 and 1028, respectively, the IoT devices 104 and the security system detectors 106 can perform the adjustments. At 1030 and 1032, respectively, the IoT devices 104 and the security system detectors 106 can transmit status over LAN that indicates that the adjustments have been made. At 1034, the status information is received by the gateway 100.

As soon as various actions are performed and associated completion status is received by the gateway 100, notification to the user can commence. At 1036, the status can be transmitted over WAN by the gateway 100. At 1038, the status can be received over WAN by the mobile device 102, e.g., for presentation to the user.

Referring to FIG. 10B, for example, the mobile device 102 can detect its own departure from the premises, and can determine and instruct actions to be performed in response thereto. For example, this differs from FIG. 10A in which the gateway 100 detects the absence of the mobile device 102.

Communication modes can already be in effect, for example, while the mobile device 102 is inside the premises 911, e.g., just before the mobile device 102 leaves the premises. For example, at 1040 and 1042, respectively, WAN communication is already established at the mobile device 102 and the gateway 100. Further, at 1043, 1044, 1046 and 1048, respectively, LAN communication is already established at the mobile device 102, the IoT devices 104, the gateway 100, and the security system detectors 106.

While the mobile device 102 is inside the premises 911, for example, at 1050, A LAN beacon can be transmitted by the gateway 100. At 1052, for example, the mobile device 102 can repeatedly detect the LAN beacon. Upon leaving the premises, at 1054, the mobile device 102 can detect the absence of the LAN beacon. During this time, at 1056, the LAN beacon transmitted by the gateway 100 goes undetected by the mobile device 102.

At 1058, adjustments to IoT devices and/or security system devices are determined by the mobile device 102. At 1060, instructions for the adjustments are transmitted over WAN. At 1062, the instructions are received by the gateway 100. At 1064, e.g., after additional processing by the gateway 100, instructions for the adjustments are transmitted over LAN. At 1066 and 1068, respectively, the instructions are received by the IoT devices 104 and the security system detectors 106. At 1070 and 1072, respectively, the IoT devices 104 and the security system detectors 106 perform the adjustments. At 1074 and 1076, respectively, the IoT devices 104 and the security system detectors 106 transmit status over LAN that indicates that the adjustments have been made. At 1078, the status information is received by the gateway 100.

As soon as various actions are performed and associated completion status is received by the gateway 100, notification to the user can commence. At 1080, the status can be transmitted over WAN by the gateway 100. At 1082, the status can be received over WAN by the mobile device 102, e.g., for presentation to the user.

FIGS. 11A-B are swim lane diagrams showing example scenarios of using combinations of WAN and LAN communications on the premises. For example, in the scenario presented in FIG. 11A, WAN and LAN communication are used concurrently. Specifically, the WAN can be used for first types of communication, such as video streaming (or other larger data packets), and the LAN can be used for second types of communication, such as status information (or other smaller data packets). In this way, more efficient use of LAN and WAN communications can be made.

WAN communication can already be in effect, for example, while the mobile device 102 is outside the premises. For example, at 1102 and 1104, respectively, WAN communication is already established at the mobile device 102 and the gateway 100.

At 1106, a LAN beacon is transmitted by the gateway 100. At 1108, the beacon sent by the gateway 100 is detected at the mobile device 102. Upon detecting the LAN beacon, steps can be taken to establish a LAN connection. At 1110 and 1112, respectively, a LAN connection can be established by the mobile device 102 and the gateway 100.

At 1114, first types of communications can be identified for being transmitted over the WAN (e.g., bandwidth intensive communications, such as video streaming from a security camera), and second types of communications can be identified for being transmitted over the LAN (e.g., less bandwidth intensive communications, such as state and status information for the IoT device and/or security system components). Subsequently, at 1116, first types of communications can be transmitted over WAN by the gateway 100. At 1118, the first types of communications can be received over the WAN by the mobile device 102. During the same time, at 1120, second types of communications can be transmitted over LAN by the gateway 100. At 1122, the first types of communications can be received over the LAN by the mobile device 102.

Referring to FIG. 11B, an example scenario is presented in which a switch from WAN to LAN communication occurs, e.g., when there is a degradation in performance on the WAN (e.g., threshold level of packet loss detected, threshold latency detected, less than threshold bandwidth available). WAN communication may still be in effect, for example, from the time when the mobile device 102 was outside the premises. For example, at 1124 and 1126, respectively, WAN communication is already established at the mobile device 102 and the gateway 100.

The mobile device 102 may enter the premises. At 1128, a LAN beacon is transmitted by the gateway 100. At 1130, the beacon sent by the gateway 100 is detected at the mobile device 102.

Over time, WAN communication may fall below a threshold level, e.g., while the mobile device 102 is on the premises. For example, at 1132, the WAN communication link can be detected to have fallen below threshold quality level (e.g., latency, bandwidth, packet loss). Because LAN communication is available (e.g., the LAN beacon was received), LAN communication can replace the WAN communication. For example, at 1134 and 1136, respectively, a LAN connection can be established by the mobile device 102 and the gateway 100.

FIGS. 12A and 12B are swim lane diagrams showing example scenarios for enrollment of a mobile device with a security system. For example, FIG. 12A is a swim lane diagram for a scenario for local enrollment by a mobile device 102 with the security system (e.g., through the gateway 100). FIG. 12B, for example, is a swim lane diagram for a scenario for remote distribution of settings to mobile device after enrollment (e.g., user buys a new mobile device 102, device settings are accidentally lost).

At 1202, the mobile computing device 102 receives input from a user instructing that a security system application be installed and/or launched on the mobile device 102. For example, the user can download and install an application on the mobile device 102 for communicating with the security system using the gateway 100.

At 1204, the mobile device 102 can receive user input that includes a username, password, and selection of an enrollment option. Such input can be received through a user interface provided by the application that was launched on the mobile device 102.

At 1206, the gateway 100 can receive user selection (e.g., pressing) a physical enrollment button that can be located, for example, on the back side of the gateway 100. Other physical enrollment initiation implementations are possible, such as detecting the mobile device 102 being within a threshold distance of the gateway 100 and/or a LAN-based connection between the mobile device 102 and the gateway 100.

At 1208, the mobile device 102, for example, can begin to broadcast (e.g., over the LAN to the gateway 100) a request to enroll the mobile device 102 with the gateway 100. The gateway 100 can locally manage the enrollment of mobile devices, in contrast to mobile devices enrolling with the gateway through a remote server system. The request can include, for example, a hash of the username and password entered with the mobile device 102.

At 1210, the gateway 100 can receive the request. In response to receiving the request, the gateway 100 can verify that the gateway 100 is in enrollment mode (e.g., physical enrollment button pressed) and can also verify that the hash matches a username and password that has been setup with the gateway 100 (and/or a remote system).

At 1212, the gateway 100 can configure itself to establish a connection to enroll the mobile device 102 with the gateway 100. This configuration at 1212 can be performed in response to determining that the hash of the password and username from the mobile device 102 matches a hash of the password and username maintained by the gateway 100.

At 1214, a connection is made with the mobile device 102. The connection can be made by the gateway 100 in response to the advertisement received from the mobile device 102.

At 1216, a full enrollment request is formulated at the mobile device 102. The enrollment request can include, for example, a username, a password, a hardware identifier for the mobile device 102, a temporary LAN encryption key (e.g., temporary BLUETOOTH encryption key), and/or a wireless communication hardware type (e.g., BLUETOOTH device type). The enrollment request can additionally be encrypted with, for example, a public key that is published by the gateway 100.

At 1218, the mobile device 102 can send an encrypted enrollment request to the gateway 100.

At 1220, the gateway 100 can receive the encrypted enrollment request and decrypt the enrollment request using a private key of the gateway 100.

At 1222, the username and password can be validated at the gateway 100. The previous validation of the hash of the username and password at step 1210 may be different from validation of the encrypted username and password provided by the mobile device 102. For example, the hash of the username and password may only provide an indication of the username and password values (e.g., hashed value onto which the username and password non-uniquely map). Other username and password combinations may provide the same hash value as well. However, for the purpose of an initial/rough verification to initiate the enrollment process at step 1210, the hash value can provide sufficient verification to initially determine whether the enrollment process should proceed. The full (non-hashed) value of the username and password can be provided through encryption and used by the gateway 100 to validate the user at step 1222.

At 1224, the gateway 100 can encrypt and send system information for the gateway 100 to the mobile device 102 (in response to the username and password being validated). The system information can include, for example, a LAN encryption key for the gateway 100 (e.g., BLUETOOTH encryption key), a LAN identifier for the gateway (e.g., BLUETOOTH id for the gateway 100), a MAC address for the gateway 100, and a device identifier for the mobile device 102 that has been generated by the gateway 100 (e.g., LAN id for the mobile device 102 generated by the gateway 100).

At 1226, the system information is decrypted at the mobile device 102 (e.g., using the temporary BLUETOOTH encryption key) and stored for use communicating with the gateway 100.

Referring to FIG. 12B, for example, a scenario is presented for remote distribution of settings to the mobile device 102 after enrollment, e.g., for use if the user buys a new mobile device 102 and/or the settings for the gateway 100 are lost on the mobile device 102 (e.g., mobile device 102 is wiped).

At 1228, the user 1201 may buy a new phone, e.g., replacing the existing mobile device 102 that the user 1202 was using to communicate with the gateway 100.

At 1230, input can be received to install and launch an application (similar to 1202) and, at 1232, input can be received with the username and password for a user associated with the mobile device 102 (similar to 1204).

At 1234, the mobile device 102 can send the username and the password to a remote system security service 1233 that can maintain user and gateway information for users across multiple different gateways. For example, users may initially enroll (either through gateway devices or direct communication) with the remote system security service 1233 to establish a unique username with the service 1233, as well as a secure password and other user information (e.g., name, contact information, address, billing information). Users can then enroll each of their devices locally with their gateway devices, which can then upload the device enrollment information to the service 1233. The service 1233 can store such user information, device enrollment information, gateway information (e.g., unique gateway identifier), and associations there between (e.g., user-device associations, device-gateway associations, user-gateway associations).

At 1236, the remote system security service 1233 can receive the username/password from the mobile device 102 and, using the stored user/device/gateway information, can verify the user of the mobile device 102 and can determine which gateway device is associated with the user. As indicated above, usernames can be unique system-wide with the remote system security service 1233.

At 1238, the server can send confirmation to the mobile device 102 that the login using the username/password was successful.

At 1240, the mobile device 102 can receive the notification that the login was successful and can present a user interface (e.g., control screens) on the mobile device 102, such as those that are presented for interfacing with the gateway 100.

At 1242, the mobile device 102 can collect and send status information for the mobile device 102 to the remote security system service 1233. For example, the status information can include information for the device 102 and/or the user of the device 102, such as a wireless communication hardware type (e.g., BLUETOOTH device type) and a hardware identifier for the mobile device 102. The status information can also include blank or null fields for unknown values for the mobile device 102 (e.g., following the device 102 being a replacement and/or being wiped), such as a LAN encryption key for the gateway 100 (e.g., BLUETOOTH encryption key), a LAN identifier for the gateway (e.g., BLUETOOTH id for the gateway 100), a MAC address for the gateway 100, and a device identifier for the mobile device 102 that has been generated by the gateway 100 (e.g., LAN id for the mobile device 102 generated by the gateway 100).

At 1244, the server can receive the status information and can determine that one or more fields that may be required, such as identifiers for the gateway 100, are missing/blank.

At 1246, the remote security service 1233 can connect to the gateway 100 and can request an identifier for the mobile device 102 that had been previously assigned by the gateway 100 in response to determining that the information was missing from the status information.

At 1248, the gateway 100 can assign a new device identifier for the mobile device 102 and store it along with the other information for the mobile device 102, such as the wireless communication hardware type (e.g., BLUETOOTH device type) and the hardware identifier for the mobile device 102. The gateway 100 can send the new device identifier for the mobile device 102 to the security system service 1233.

At 1250, the security system service 1233 can receive and store the newly-assigned device identifier for the mobile device 102 and, at 1252, can transmit new device registration information for the gateway 100 to the mobile device 102. The new device registration information can include, for example, information that is similar to the system information that the gateway 100 provides to the mobile device 102 at step 1224. For example, the security system service 1233 can send information that includes the new device identifier for the mobile device 102, a LAN encryption key for the gateway 100 (e.g., BLUETOOTH encryption key), a LAN identifier for the gateway (e.g., BLU-ETOOTH id for the gateway 100), a MAC address for the gateway 100.

At 1254, the mobile device 102 can receive and store the registration information, and can use it to connect to the gateway 100, such as through a WAN connection and/or a LAN connection when the device 102 is located at or away from the premises where the gateway 100 is located.

FIG. 13 is a block diagram of example computing devices 1300, 1350 that may be used to implement the systems and methods described in this document, as either a client or as a server or plurality of servers. Computing device 1300 is intended to represent various forms of digital computers, such as laptops, desktops, workstations, personal digital assistants, servers, blade servers, mainframes, and other appropriate computers. Computing device 1300 is further intended to represent any other typically non-mobile devices, such as televisions or other electronic devices with one or more processers embedded therein or attached thereto. Computing device 1350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1300 includes a processor 1302, memory 1304, a storage device 1306, a high-speed controller 1308 connecting to memory 1304 and high-speed expansion ports 1310, and a low-speed controller 1312 connecting to low-speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high-speed controller 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a computer-readable medium. In one implementation, the memory 1304 is a volatile memory unit or units. In another implementation, the memory 1304 is a non-volatile memory unit or units.

The storage device 1306 is capable of providing mass storage for the computing device 1300. In one implementation, the storage device 1306 is a computer-readable medium. In various different implementations, the storage device 1306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1304, the storage device 1306, or memory on processor 1302.

The high-speed controller 1308 manages bandwidth-intensive operations for the computing device 1300, while the low-speed controller 1312 manages lower bandwidth-intensive operations. Such allocation of duties is an example only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed bus 1314. The low-speed bus 1314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1300 may be implemented in a number of different forms and/or virtualized, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as computing device 1350. Each of such devices may contain one or more of computing devices 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The computing device 1350 may also be provided with a storage device, such as a micro-drive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can process instructions for execution within the computing device 1350, including instructions stored in the memory 1364. The processor may also include separate analog and digital processors. The processor may provide, for example, for coordination of the other components of the computing device 1350, such as control of user interfaces, applications run by computing device 1350, and wireless communication by computing device 1350.

Processor 1352 may communicate with a user through control interface 1358 and display interface 1356 coupled to a display 1354. The display 1354 may be, for example, a TFT LCD display or an OLED display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of computing device 1350 with other devices. External interface 1362 may provide, for example, for wired communication (e.g., via a docking procedure) or for wireless communication (e.g., via Bluetooth® or other such technologies).

The memory 1364 stores information within the computing device 1350. In one implementation, the memory 1364 is a computer-readable medium. In one implementation, the memory 1364 is a volatile memory unit or units. In another implementation, the memory 1364 is a non-volatile memory unit or units. Expansion memory 1374 may also be provided and connected to computing device 1350 through expansion interface 1372, which may include, for example, a subscriber identification module (SIM) card interface. Such expansion memory 1374 may provide extra storage space for computing device 1350, or may also store applications or other information for computing device 1350. Specifically, expansion memory 1374 may include instructions to carry out or supplement the processes described above, and may include secure information also. Thus, for example, expansion memory 1374 may be provide as a security module for computing device 1350, and may be programmed with instructions that permit secure use of computing device 1350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352.

Computing device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1368 (e.g., a radio-frequency transceiver). In addition, short-range communication may occur, such as using a Bluetooth®, WiFi, or other such transceiver (not shown). In addition, GPS receiver module 1370 may provide additional wireless data to computing device 1350, which may be used as appropriate by applications running on computing device 1350.

Computing device 1350 may also communicate audibly using audio codec 1360, which may receive spoken information from a user and convert it to usable digital information. Audio codec 1360 may likewise generate audible sound for a user, such as through a speaker, e.g., in a handset of computing device 1350. Such sound may include sound from voice telephone calls, may include recorded sound (e.g., voice messages, music files, etc.) and may also include sound generated by applications operating on computing device 1350.

The computing device 1350 may be implemented in a number of different forms, as shown in the figure. For example, it may be implemented as a cellular telephone 1380. It may also be implemented as part of a smartphone 1382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A wireless security system premises gateway component comprising:
    a first local area wireless communication component adapted to communicate wirelessly with plural wireless security system sensors distributed at a premises;
    a second local area wireless communication component different from the first local area wireless communication component and adapted to communicate wirelessly with a general purpose mobile communications device;
    a communications interface component different from both of the first local area wireless communication component and the second local area wireless communication component, and adapted to communicate with a wide area communications network that is located remotely of the premises, the communications interface component configured to receive communications originating from the general purpose mobile communications device; and
    a security system controller component adapted to communicate with the general purpose mobile communications device to provide state information regarding the security system and to provide control inputs to the security system, wherein the security system controller component is adapted to communicate with the general purpose mobile communications device using direct wireless transmissions between the general purpose mobile communications device and the second local area wireless communication component when the general purpose mobile communications device is in communications range of the second local area wireless communications component, and wherein the security system controller component is also adapted and configured to communicate with the general purpose mobile communications device using indirect transmissions carried over the remotely located wide area communications network based on a determination by the gateway component that the general purpose mobile communications device is not located at the premises of the gateway;
    and wherein the gateway component serves as a central to each of the general purpose mobile communications device and the plural wireless security system sensors, the plural wireless security system sensors configured as peripherals.

2. The wireless security system premises gateway component of claim 1, wherein the gateway component does not include a display component providing a graphical user interface or textual user interface.

3. The wireless security system premises gateway component of claim 1, wherein the direct communications between the general purpose mobile communications device and the gateway component using the second local area wireless communication component are performed under a topology in which the gateway component is configured as a hub and the general purpose mobile communications device is configured as a peripheral.

4. The wireless security system premises gateway component of claim 3, wherein the second local area wireless communication component is a component that utilizes a Bluetooth low energy protocol.

5. The wireless security system premises gateway component of claim 4, wherein under the Bluetooth low energy protocol the gateway component is configured as a central and the general purpose mobile communications device is configured as a peripheral.

6. The wireless security system premises gateway component of claim 1, wherein the second local area wireless communication component is adapted to communicate wirelessly with a two-way user interface and control device specifically designed for use with the security system.

7. The wireless security system premises gateway component of claim 1, wherein the second local area wireless communication component is adapted to communicate wirelessly with the plurality of devices that are located in or around the premises, wherein the plurality of devices each include one or more of the following: (i) components to monitor and transmit status information and (ii) components that are remotely controllable and manage operation of one or more devices;
    the wireless security system premises gateway component further comprising:
        a local device communication controller that is configured to provide a communication interface between the general purpose mobile communications device and the plurality of devices using indirect transmissions carried over the remotely located wide area communications network.

8. The wireless security system premises gateway component of claim 7, wherein the plurality of devices is part of an internet of things ecosystem at or around the premises.

9. The wireless security system premises gateway component of claim 7, wherein for communication between the gateway component and the plurality of device the gateway component is configured as a central and the plurality of devices are configured as peripherals.

10. A computer-implemented method for providing a premises system interface, the method comprising:
    determining, by an application running on a mobile communications device, whether the mobile communications device is operating in a first communications mode or a second communications mode, wherein the first communications mode is used when the mobile communications device is in communications range of a communications component for a wireless security gateway located at a premises, wherein the second communications mode is used when the mobile communications device is not within the communications range of the communications component for the wireless security gateway, wherein the mobile communications device includes (i) a first local area wireless communication component that is adapted to communicate with the wireless security gateway to provide first wireless communication and (ii) a second local area wireless communication component that is adapted to communicate with a plurality of devices located in or around the premises to provide second wireless communication, wherein the first local area wireless communication component is different from the second local area wireless communication component;

communicating, by the application and in response to determining that the mobile communications device is operating in the first communications mode, with the wireless security gateway using a local area wireless communications system, the wireless security gateway determining that the general purpose mobile communications device is located at the premises of the gateway, wherein the local area wireless communications system provides a direct wireless connection between the mobile communications device and the wireless security gateway, wherein the mobile communications device communicates in a peripheral role with the wireless security gateway and communicates in a central role with the plurality of devices located in or around the premises;

detecting, by the application, that the mobile communications device has switched from operating in the first communications mode to operating in the second communications mode;

communicating, by the application and in response to detecting the switch from the first communications mode to the second communications mode, with the wireless security gateway using a wide area wireless communications system, the wireless security gateway determining that the general purpose mobile communications device is not located at the premises of the gateway, wherein the wide area wireless communications system provides an indirect wireless connection between the mobile communications device and the wireless security gateway; and stopping, by the application, the communicating with the wireless security gateway using the local area wireless communication system.

11. The computer-implemented method of claim 10, wherein the first communications mode comprises communication over a local area wireless connection.

12. The computer-implemented method of claim 11, wherein the local area wireless connection comprises a wireless connection using a Bluetooth low energy protocol.

13. The computer-implemented method of claim 12, wherein the mobile communications device is configured to communicate as a peripheral over the wireless connection using the Bluetooth low energy protocol with the wireless security gateway acting configured as a central.

14. The computer-implemented method of claim 10, wherein the first communications mode comprises first communication over a local area wireless connection and second communication over a wide area network, the first communication being concurrent with the second communication.

15. The computer-implemented method of claim 14, further comprising:
transmitting, by the mobile communications device, a first type of communication over the local area wireless connection as part of the first communication; and
transmitting, by the mobile communications device, a second type of communication over the wide area network as part of the second communication.

16. The computer-implemented method of claim 15, wherein:
the first type of communication comprises low bandwidth communication below or equal to a bandwidth threshold, and
the second type of communication comprises high bandwidth communication above the bandwidth threshold.

17. The computer-implemented method of claim 16, wherein the second communications mode comprises communication over a wide area network connection.

18. The wireless security system premises gateway component of claim 1, comprising a single gateway housing configured and sized to house the first local area wireless communication component, the second local area wireless communication component, the communications interface component, the security system controller, and a local device communication controller.

* * * * *